United States Patent
Urakami et al.

(10) Patent No.: US 6,310,147 B1
(45) Date of Patent: *Oct. 30, 2001

(54) EPOXY-RESIN COMPOSITION AND USE THEREOF

(75) Inventors: Tatsuhiro Urakami; Kenichi Sugimoto; Takuo Tajima; Koutaro Suzuki; Keisuke Takuma; Tadahito Nobori; Usaji Takaki, all of Kanagawa (JP)

(73) Assignee: Mitsui Chemicals, Inc. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/312,701

(22) Filed: May 17, 1999

(30) Foreign Application Priority Data

| May 21, 1998 | (JP) | 10-140178 |
| Jun. 11, 1998 | (JP) | 10-163714 |
| Aug. 6, 1998 | (JP) | 10-223366 |
| Nov. 6, 1998 | (JP) | 10-315984 |
| Dec. 8, 1998 | (JP) | 10-349011 |

(51) Int. Cl.$^7$ .................... C08F 283/00; C08L 63/00; B32B 27/38
(52) U.S. Cl. .................... 525/481; 523/466; 523/468; 428/413; 428/418; 428/620
(58) Field of Search .................... 525/481; 523/466, 523/468; 428/413, 418, 620

(56) References Cited

U.S. PATENT DOCUMENTS

| 3,759,872 | 9/1973 | Lorenz et al. | |
| 5,756,564 | * 5/1998 | Murata et al. | 523/466 |
| 5,872,196 | * 2/1999 | Murata et al. | 525/481 |
| 5,910,548 | * 6/1999 | Murata et al. | 525/481 |
| 5,916,683 | * 6/1999 | Ueda et al. | 525/481 |

FOREIGN PATENT DOCUMENTS

| 0950649A1 | 10/1999 | (EP) . |
| 62-53327 | 3/1987 | (JP) . |
| 9-235451 | 9/1997 | (JP) . |

OTHER PUBLICATIONS

G.N. Koidan, A.P. Marchenko, and A.M. Pinchuk, "Methylation of the Phosphoryl Group by Methyl Iodide", *Journal of General Chemistry of The USSR*, 55, p. 1453 (1985).

Tadatomi Nishikubo, "Addition Reaction of Epoxy Compounds with Esters and Its Application for Polymer Syntheses", *Yuuki Gousei Kagaku (organic syntheses) 49*, pp. 218–233 (1991).

* cited by examiner

*Primary Examiner*—Philip Tucker
(74) *Attorney, Agent, or Firm*—Burns, Doane, Swecker, & Mathis, L.L.P.

(57) ABSTRACT

An epoxy-resin composition comprising (A) an at least bifunctional epoxy compound and/or an at least bifunctional epoxy resin, (B) an at least bifunctional ester-containing compound and/or an at least bifunctional ester-containing resin as a curing agent, 10 to 100% of whose hydroxy groups are esterified with aliphatic or aromatic acyl groups, and (C) an accelerating agent, the accelerating agent essentially containing a phosphine oxide represented by general formula (1):

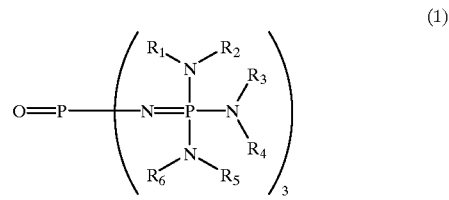

(1)

where $R_1$ to $R_6$ all of which may be the same or not are hydrogen, straight, branched or cyclic alkyl having 1 to 10 carbons or aryl or aralkyl having 6 to 10 carbons.

16 Claims, No Drawings

EPOXY-RESIN COMPOSITION AND USE THEREOF

BACKGROUND OF THE INVENTION

1. Field of the Invention

This invention relates to a semiconductor device where a semiconductor integrated circuit is sealed with an epoxy resin; to an epoxy-resin composition with adequate properties for sealing it, in particular reduced hygroscopicity, good melt flow properties and good overall crack resistance; and to a cured product thereof. Specifically, this invention relates to an epoxy-resin composition comprising an at least bifunctional epoxy resin, in particular an epoxy resin derived from dihydroxynaphthalene, a biphenol, a novolac resin, a phenol aralkyl resin or a phenol-dicyclopentadiene resin; an at least bifunctional ester-containing compound and/or an at least bifunctional ester-containing resin as a curing agent, in particular an ester-containing resin derived from a novolac resin, a phenol aralkyl resin, a phenol-dicyclopentadiene or a naphthol aralkyl resin; and a catalyst capable of quickly reacting an ester group with an epoxy group, and a cured product thereof.

2. Description of the Related Art

An integrated circuit (IC) or a large scale integrated circuit (LSI) is practically protected by a sealer for eliminating malfunction due to dirt or dust in the outer atmosphere, heat, moisture or light.

Such a sealer has been recently shifted from a metal or ceramic to a resin, and at present sealing is mainly made with an epoxy resin.

Specifically, in the light of balance between cost and physical properties, there have been often used an epoxy-resin composition comprising a phenol resin as a curing agent. A sealer comprising an epoxy-resin composition as described above has been demanded to be improved in its mechanical properties and the following drawbacks;

(1) it absorbs moisture in the outside air and thus may be cracked due to explosive gasification of the moisture when exposed to a high temperature under soldering conditions;

(2) there may partially occur homopolymerization of an epoxy monomer as a side reaction during a curing process which causes excessive hydroxy groups in a resulting phenol resin, leading to deterioration of moisture resistance and electric characteristics, as well as deterioration in mechanical characteristics due to the presence of epoxy-homopolymerization and excessive phenol-resin parts other than a desired epoxy-phenol resin network; and (3) contamination with free ions, in particular halogen ions may cause corrosion of metal parts in semiconductor or electric leakage.

Ionic impurities as described in (3) may be controlled by refining the epoxy resin; (1) and (2) may be controlled by reforming the resin and minimizing side reactions, respectively, to allow the desired physical properties for an epoxy-resin composition to be adequately attained.

Common sealers recently used for a semiconductor include a relatively inexpensive combination of o-cresol novolac type of epoxy resin (trade name: EOCN-102S, Nihon Kayaku, etc.) and a phenol novolac resin (trade name: BRG#558, Showa Kobunshi, etc.) as a universal grade sealer; and a combination of biphenol or a tetramethylbiphenol type of epoxy resin (trade name: YX4000, Yuka Shell Epoxy, etc.) and a phenol aralkyl resin (trade name: MilexXLC-4L, Mitsui Chemical Inc., etc.) as a high grade sealer.

The former combination is characterized in improved heat resistance by the use of an epoxy resin and a curing agent having a higher functional group density and a lower cost, but has a drawback to be improved that its higher functional group density makes it highly hygroscopic and its higher melt viscosity reduces the limit of its filler filling rate. The latter combination is characterized in improved workability because of combining a crystalline epoxy resin having a melting point of near 100° C. and having a reduced melting viscosity and a lower hygroscopic and flexible phenol aralkyl resin, and improved crack resistance because of its lower hygroscopicity, but has been demanded not only to reduce a cost, but also to solve the problem that its heat resistance is deteriorated due to reduction in its crosslink density caused by using a mainly bifunctional epoxy resin.

In terms of the problem (1) of moisture absorption of a resin, as long as curing is a reaction between an epoxy group with a hydroxyl group, the curing reaction inevitably produces a hydroxyl group as illustrated by the equation below;

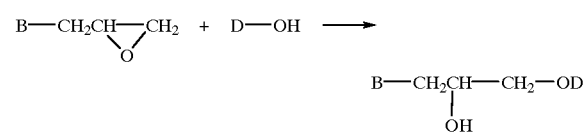

where B is an epoxy residue and D is a phenol residue.

The hydroxyl group may increase the hydrophilicity of the resin. It may restrict reduction in an overall coefficient of moisture absorption even when the resin backbone is made hydrophobic.

To solve the problem, JP-A 62-53327 by Nishikubo et al. has suggested a certain reaction of an epoxy group with an ester group.

In the specification, quaternary onium salts and crown ether complexes have been listed as a preferable catalyst. In addition, they have shown yields when using the specific catalysts in a unit reaction, in their paper (Nishikubo et al., Yuki Gosei Kagaku, vol.49, 218–233 (1991), "An addition reaction of an epoxy compound with an ester and its applications in polymer synthesis". According to the paper, tetrabutylammonium chloride gives the highest yield of 91% but the yield are generally low. When remaining in a resin as a sealer for a semiconductor integrated circuit, a quaternary onium salt or crown ether may, of course, cause not only undesirable effects such as electric short-circuit, but also erosion of metal parts in contact with the sealer, leading to a major defect.

In an addition reaction of an epoxy resin with a phenol resin, catalysts used include phosphines such as trialkylphosphines and triarylphosphines; imidazoles; and tertiary amines; particularly imidazoles and phosphines are often employed for sealing a semiconductor.

It is, however, known that an imidazole compound is highly reactive, but tends to cause the epoxy-homopolymerization, leading to the problem (2). On the other hand, a phosphine does not cause such a problem, but cures too slowly.

When applying an imidazole compound as a catalyst to an epoxy/ester curing reaction, a desired addition reaction of an ester group to an epoxy group may occur in a reaction yield of about 50% and otherwise there may occur side reactions such as epoxy homopolymerization, according to the paper by Nishikubo et al. Thus, the catalyst does not give an acceptable cured product.

According to our replication, it has been found that when using an imidazole or phosphine compound as a curing catalyst, an ester-containing resin esterified by an acyl group of this invention does not essentially react with an epoxy resin to give a cured product.

Specifically, the resin composition fails to be gelled for more than 10 min at 150 to 200° C. which is a temperature range usually used for curing, and thus do not provide a cured product, but in reality the resin composition will be flown out (see, Comparative Examples later).

JP-A 9-235451 has been suggested a process where 10 to 90% of a phenol resin is esterified, which is then used for ester-curing of an epoxy resin to give a sealer for a semiconductor integrated circuit.

The process is based on a concept that some of phenolic hydroxy groups in the starting phenol resin are left unreacted and thus the reactive phenolic moieties first form crosslinks in an initial curing step and the product is then after-cured by reacting its epoxy groups with ester groups, to give an ester resin.

The specification has disclosed phosphines, imidazoles and diazabicyclo compounds as a curing catalyst. However, phosphines does not exhibit adequate performance as a curing catalyst for an epoxy and an ester group as shown herein (see, Comparative Examples later); and imidazoles and diazabicyclo compounds cause epoxy homopolymerization to a significant degree, makes it difficult to adjust a molar ratio of epoxy groups to functional groups in the curing agent, and adversely affects product's physical properties as indicated in the paper by Nishikubo et al. In addition, the specification has indicated that a compound esterified with an aliphatic acyl group is not preferable for reaction with an epoxy group.

SUMMARY OF THE INVENTION

An object of this invention is to provide an epoxy-resin composition for sealing a semiconductor with lower hygroscopicity, good crack resistance and good electric properties, comprising of epoxy resin, and a phenol resin as a curing agent, whose hydroxyl group is esterified with an aliphatic or aromatic acyl group, in combination with a unique curing catalyst (accelerating agent) for effectively curing the resin; a cured product thereof; and a semiconductor device using the composition.

We have intensely attempted to solve the above problems and finally have found that a certain accelerating agent may be used to solve the problems.

An epoxy-resin composition according to this invention can be used in those applications in which a conventional epoxy-resin composition has been used; in particular as a sealer for a semiconductor to give a package better in crack resistance than that from a conventional epoxy resin-phenol resin cured product.

Specifically, this invention provides (a) An epoxy-resin composition comprising (A) an at least bifunctional epoxy compound and/or an at least bifunctional epoxy resin, (B) an at least bifunctional ester-containing compound and/or an at least bifunctional ester-containing resin as a curing agent, 10 to 100% of whose hydroxy groups are esterified with aliphatic or aromatic acyl groups, and (C) an accelerating agent, the accelerating agent essentially containing a phosphine oxide represented by general formula (1):

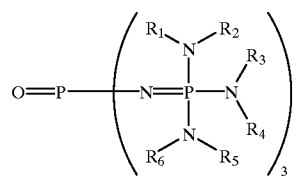

(1)

where $R_1$ to $R_6$ all of which may be the same or not are hydrogen, straight, branched or cyclic alkyl having 1 to 10 carbons or aryl or aralkyl having 6 to 10 carbons.

(b) An epoxy-resin composition as described in (a) where (A) the at least bifunctional epoxy compound and/or an at least bifunctional epoxy resin is selected from an epoxy resin derived from a dihydroxynaphthalene represented by general formula (2), an epoxy resin derived from a biphenol represented by general formula (3), an epoxy resin derived from a novolac type of resin represented by general formula (4), an epoxy resin derived from a phenol aralkyl resin represented by general formula (5) and an epoxy resin derived from a phenol-dicyclopentadiene resin represented by general formula (6) ;

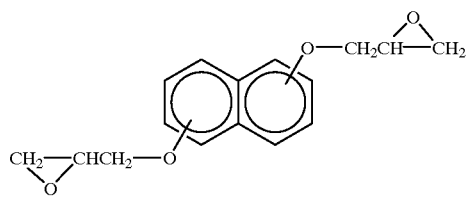

(2)

where the ring is substituted with 2,3-epoxypropyl groups at 1, 5-, 1,6-, 1,7-, 2,6- or 2,7-positions

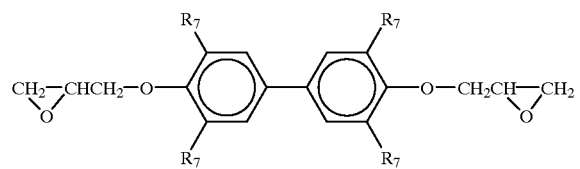

(3)

where $R_7$ all of which may be the same or not is hydrogen or methyl;

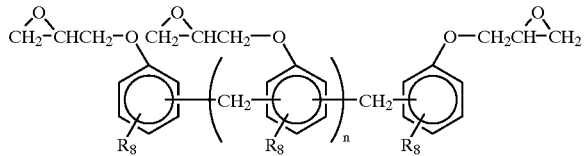

(4)

where $R_8$ is hydrogen, methyl or ethyl, and n is an integer of 0 to 100 whose average is 0 to 15;

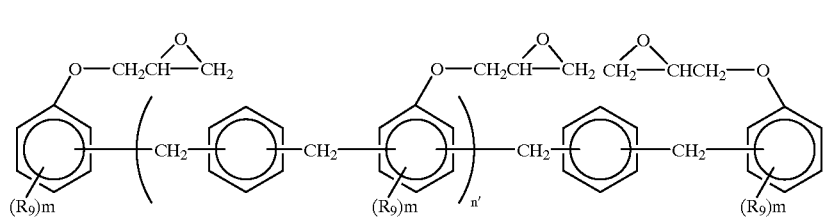
(5)

where $R_8$ is hydrogen, straight, branched or cyclic alkyl having 1 to 10 carbons, alkoxy having 1 to 10 carbons, hydroxyl, phenyl or halogen; m is an integer of 1 to 3; and n' is an integer of 0 to 100 whose average is 0 to 50;

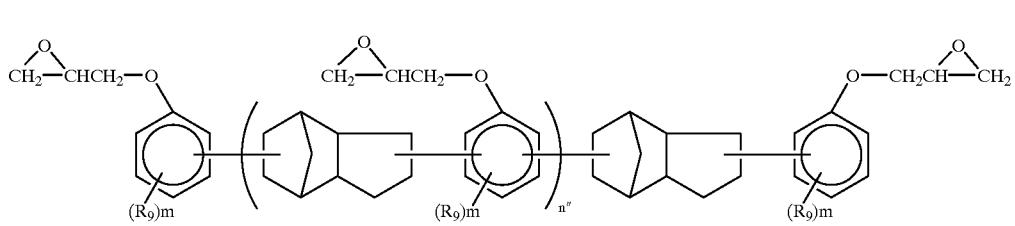
(6)

where $R_9$ is hydrogen, straight, branched or cyclic alkyl having 1 to 10 carbons, alkoxy having 1 to 10 carbons, hydroxyl, phenyl or halogen; m is an integer of 1 to 3; and n" is an integer of 0 to 50 whose average is 0 to 15.

(c) An epoxy-resin composition as described in (a) or (b) where (B) the at least bifunctional ester-containing compound and/or the at least bifunctional ester-containing resin, 10 to 100% of whose hydroxy groups are esterified with aliphatic or aromatic acyl groups, is selected from ester-containing resins derived from a novolac type of resin represented by general formula (7);

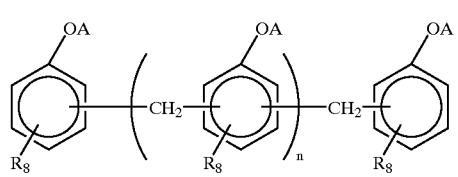
(7)

where $R_8$ is hydrogen, methyl or ethyl; A is hydrogen or acyl where the molar ratio of hydrogen/acyl is 90/10 to 0/100; and n indicating a repeating unit number is an integer of 0 to 100 whose average is 0 to 15, provided when an average of n as a repeating unit number is zero, the formula represents bisphenol derivatives;

a phenol aralkyl resin represented by general formula (8);

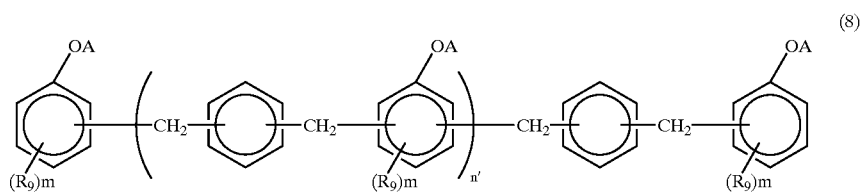
(8)

where $R_9$ is hydrogen, straight, branched or cyclic alkyl having 1 to 9 carbons, alkoxy having 1 to 10 carbons, phenyl, hydroxy or halogen; m is an integer of 1 to 3; n' indicating a repeating unit number is an integer of 0 to 100 whose average is 0 to 50, provided when an average of n' as a repeating unit number is zero, the formula represents bisphenol derivatives; and A is hydrogen or acyl where the molar ratio of hydrogen/acyl is 90/10 to 0/100;

a phenol-dicyclopentadiene resin represented by general formula (9);

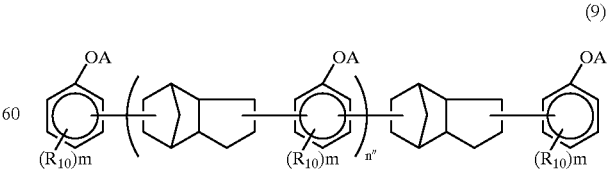
(9)

where $R_{10}$ is hydrogen, straight, branched or cyclic alkyl having 1 to 10 carbons, phenyl, hydroxy, halogen or alkoxy having 1 to 9 carbons; m is an integer of 1 to 3; n" indicating a repeating unit number is an integer of 0 to 50 whose average is 0 to 15, provided when an average of n" as a repeating unit number is zero, the formula represents bisphenol derivatives; and A is hydrogen or acyl where the molar ratio of hydrogen/acyl is 90/10 to 0/100; and a naphthol aralkyl resin represented by general formula (10);

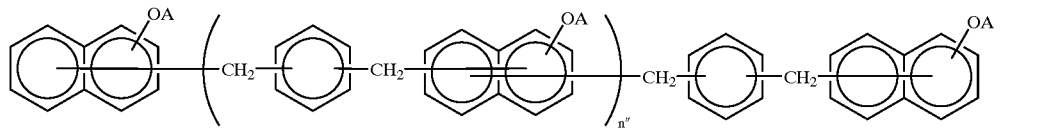

where n" indicating a repeating unit number is an integer of 0 to 50 whose average is 0 to 15, provided when an average of n" as a repeating unit number is zero, the formula represents bisphenol derivatives; and A is hydrogen or acyl where the molar ratio of hydrogen/acyl is 90/10 to 0/100.

(d) An epoxy-resin composition as described in any of (a) to (c) comprising (D) an organic and/or inorganic filler in the range of 100 to 1900 parts by weight per 100 parts by weight of (A)+(B).

(e) A cured product prepared by heat curing of the epoxy-resin composition as described in (d).

(f) A semiconductor device manufactured by sealing a semiconductor integrated circuit using the epoxy-resin composition as described in (d).

(g) An epoxy-resin composition comprising (A) an at least bifunctional epoxy compound and/or an at least bifunctional epoxy resin, (B) an at least bifunctional ester-containing compound and/or an at least bifunctional ester-containing resin as a curing agent, 10 to 100% of whose hydroxy groups are esterified with acyl groups, and (C) an accelerating agent, which provides a cured product, below 10 wt % of which is extracted with refluxing acetone for 2 hours.

(h) An epoxy-resin composition as described in Claim (g) comprising (D) an organic and/or inorganic filler in the range of 100 to 1900 parts by weight per 100 parts by weight of (A)+(B).

(i) A cured product prepared by heat curing of the epoxy-resin composition as described in (h).

(j) A semiconductor device manufactured by sealing a semiconductor integrated circuit using the epoxy-resin composition as described in (h).

DETAILED DESCRIPTION OF THE PREFERRED EMBODIMENTS

This invention typically provides an epoxy-resin composition comprising (A) an at least bifunctional epoxy compound and/or an at least bifunctional epoxy resin, (B) an at least bifunctional ester-containing compound and/or an at least bifunctional ester-containing resin as a curing agent, 10 to 100% of whose hydroxy groups are esterified with acyl groups, and (C) an accelerating agent, the accelerating agent essentially containing a phosphine oxide represented by the general formula (1). The epoxy-resin composition of this invention comprises the phosphine oxide to allow an epoxy group to quickly and selectively react with an ester group and thus to solve the above problems in (1) and (2) and provides a cured product with excellent mechanical properties, especially lower hygroscopicity, good crack resistance and good electric properties.

Furthermore, a resin composition comprising the resin in combination with an organic and/or an inorganic filler exhibits quite excellent performance as a sealer for a semiconductor integrated circuit, which has been observed by the inventors for the first time.

There will be described an essential component, a phosphine oxide represented by general formula (1), as an accelerating agent.

In general formula (1), $R_1$ to $R_6$ all of which may be the same or not are hydrogen, straight, branched or cyclic alkyl having 1 to 10 carbons or aryl or aralkyl having 6 to 10 carbons.

Specifically, $R_1$, to $R_6$ may be selected from hydrogen; aliphatic hydrocarbons such as methyl, ethyl, n-propyl, isopropyl, n-butyl, sec-butyl, tert-butyl, 1-pentyl, 2-pentyl, 3-pentyl, 2-methyl-1-butyl, isopentyl, tert-pentyl, 3-methyl-2-butyl, neopentyl, n-hexyl, 4-methyl-2-pentyl, cyclopentyl, cyclohexyl, 1-heptyl, 3-heptyl, 1-octyl, 2-octyl, 2-ethyl-1-hexyl, nonyl and decyl; and aryls and aralkyls such as phenyl, toluyl, benzyl, 1-phenylethyl and 2-phenylethyl; preferably aliphatic hydrocarbons having 1 to 6 carbons such as methyl, ethyl, n-propyl, isopropyl, n-butyl and cyclohexyl; more preferably methyl and ethyl.

The phosphine oxide represented by general formula (1) can be prepared by reacting phosphorus oxychloride with three molar amount of imino-tris(unsubstituted or mono- or di-substituted amino)phosphorane as described in G. N. Koian, et al., Journal of General Chemistry of The USSR, 55, 1453 (1985). If necessary, it may be further purified by a common procedure such as column chromatography, distillation and recrystallization.

In an epoxy-resin composition of this invention, (A) an at least bifunctional epoxy compound and/or an at least bifunctional epoxy resin may include any compound having two or more epoxy groups in one molecule. Specifically, it may have epoxy groups formed by oxidation of an olefin, glycidyl etherification of hydroxyl groups, glycidyl amination of a primary or secondary amine or glycidyl esterification of a carboxylic acid.

Compounds which may be subject to such epoxidation include dihydroxybenzenes such as catechol, resorcine and hydroquinone;

bisphenols such as 2,6-dihydroxynaphthalene, 1,6-dihydroxynaphthalene, 2,2-bis(4-hydroxyphenyl)propane (bisphenol A), 2-(3-hydroxyphenyl)-2-(4'-hydroxyphenyl)propane, bis(4-hydroxyphenyl)methane (bisphenol F), bis(4-hydroxyphenyl)sulfone (bisphenol S), bis(4-hydroxyphenyl)sulfide, bis(4-hydroxyphenyl)methylcyclohexane, bis(4-hydroxyphenyl)methylbenzene, 4,4'-dihydroxybiphenyl, 4,4'-dihydroxy-2,2',6,6'-tetramethylbiphenyl, 4,4'-dihydroxydiphenyl ether, 6,6'-dihydroxy-3,3,3',3'-tetramethyl-1,1-spirobiindane and 1,3,3-trimethyl-1-(4-hydroxyphenyl)-1-indan-6-ol;

oligophenols such as tetraphenylolethane and naphthol-cresol resol condensate;

phenol resins such as a phenol novolac represented by general formula (7), a residual moiety after removing the bisphenol from the novolac (at least triphenol; referred to as "VR"), a phenol aralkyl represented by general formula (8), a naphthol aralkyl represented by general formula (10), and a phenol-dicyclopentadiene copolymer resin (DPR resin) represented by general formula (9);

aliphatic and aromatic amines such as ethylenediamine, propylenediamine, hexamethylenediamine, aniline, 4,4'-diaminophenylmethane (MDA), 4,4'-diaminodiphenyl ether, 4,4'-diaminodiphenylsulfone, 2,2-bis(4,4'-diaminophenyl)propane, m-xylylenediamine, p-xylylenediamine, 1,2-diaminocyclohexane and an aniline aralkyl resin represented by general formula (1) (trade name: Anilix, Mitsui Chemical Inc.);

(11)

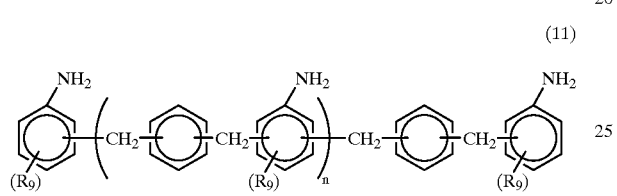

where $R_9$ is hydrogen or straight, branched or cyclic alkyl having 1 to 9 carbons; and n indicating a repeating unit number is 0 to 50 whose average is 0 to 15, provided when an average of n as a repeating unit number is zero, the formula represents a bisaniline compound;

aminophenols such as m-aminophenol, p-aminophenol, 2-(4-aminophenyl)-2-(4'-hydroxyphenyl)propane and 4-aminophenyl-4-hydroxyphenyl)methane;

carboxylic acids such as phthalic acid, isophthalic acid, terephthalic acid, tetrahydrophthalic acid, hexahydrophthalic acid, dimer acid and 1,3-dicarboxycyclohexane; and hydroxycarboxylic acids such as salicylic acid and 4-hydroxybenzoic acid.

Such compounds having an active hydrogen may be glycidylated by a known process. It may be common to react a compound with an epichlorohydrin in the presence of a hydrogen halide acceptor. It is well known that a glycidyl ester may be prepared preferably by reacting methyl carboxylate with glycidol using a metal catalyst, in particular a thallium compound such as $TlNO_3$ and $Tl(OCOCF_3)_3$.

Preferable sealers for a semiconductor integrated circuit to which this invention mainly directs may include glycidyl ethers derived from a phenol compound or phenol resin; specifically an epoxy compound derived from a dihydroxynaphthalene represented by general formula (2);

(2)

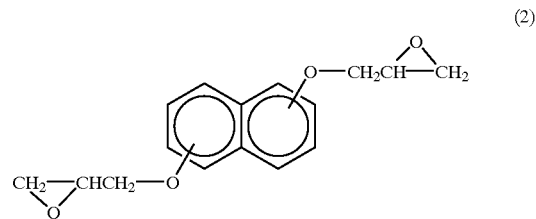

where the ring is substituted with 2,3-epoxypropyl groups at 1, 5-, 1,6-, 1,7-, 2,6- or 2,7-positions;

an epoxy resin derived from a biphenol represented by general formula (3);

(3)

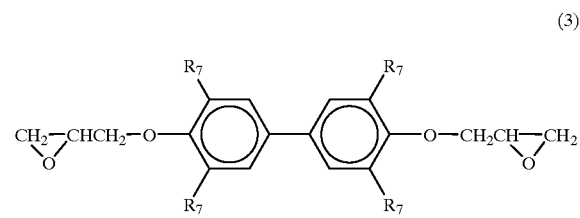

where $R_7$ all of which may be the same or not is hydrogen or methyl;

an epoxy resin derived from a novolac type of resin represented by general formula (4);

(4)

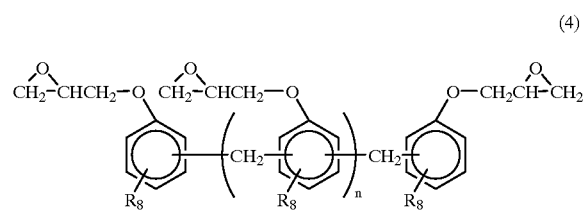

where $R_8$ is hydrogen, methyl or ethyl, and n is an integer of 0 to 100 whose average is 0 to 15;

an epoxy resin derived from a phenol aralkyl resin represented by general formula (5)

(5)

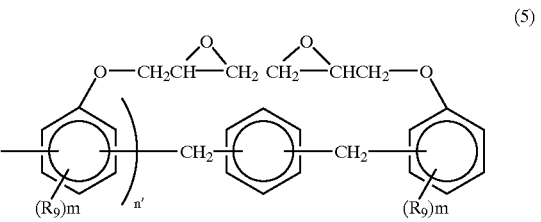

where $R_9$ is hydrogen, straight, branched or cyclic alkyl having 1 to 10 carbons, alkoxy having 1 to 10 carbons, hydroxyl, phenyl or halogen; m is an integer of 1 to 3; and n' is an integer of 0 to 100 whose average is 0 to 50; and an epoxy resin derived from a phenol-dicyclopentadiene resin represented by general formula (6);

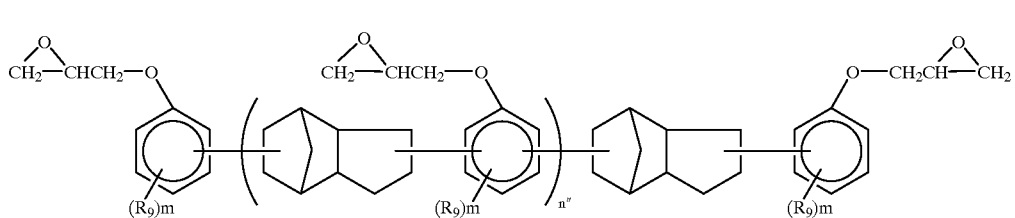

(6)

where $R_9$ is hydrogen, straight, branched or cyclic alkyl having 1 to 10 carbons, alkoxy having 1 to 10 carbons, hydroxyl, phenyl or halogen; m is an integer of 1 to 3; and n" is an integer of 0 to 50 whose average is 0 to 15.

In an epoxy-resin composition of this invention, (B) an at least bifunctional ester-containing compound and/or an at least bifunctional ester-containing resin, 10 to 100 mol % of whose hydroxy groups are esterified with aliphatic or aromatic acyl groups. Compounds which may be subject to such esterification may include those having two or more phenolic hydroxy groups in one molecule; thus all of the phenols or the phenol resins as an epoxy material can be used. Specific examples include a novolac resin represented by general formula (7');

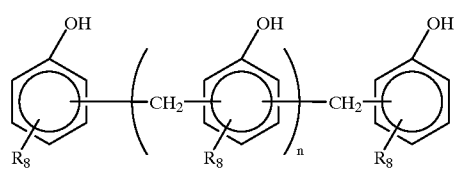

(7')

where $R_8$ is hydrogen, methyl or ethyl; and n indicating a repeating unit number is an integer of 0 to 100 whose average is 0 to 15, such as a phenol novolac resin and a cresol novolac resin, provided when an average of n as a repeating unit number is zero, the formula represents a bisphenol compound;

a residual moiety after removing the bisphenol from the novolac (at least triphenol; referred to as "VR");

a phenol aralkyl resin represented by general formula (8')

where $R_9$ is hydrogen, straight, branched or cyclic alkyl having 1 to 9 carbons, phenyl, hydroxy, halogen or alkoxy having 1 to 10 carbons; m is an integer of 1 to 3; n' indicating a repeating unit number is an integer of 0 to 100 whose average is 0 to 50, provided when an average of n' as a repeating unit number is zero, the formula represents a bisphenol compound;

a phenol-dicyclopentadiene resin represented by general formula (9');

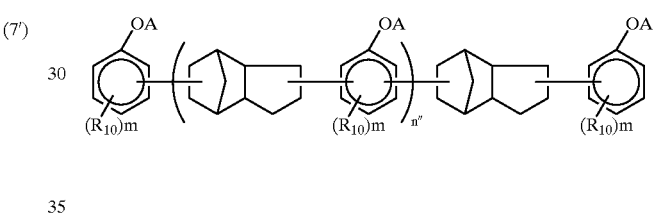

(9')

where $R_{10}$ is hydrogen, straight, branched or cyclic alkyl having 1 to 10 carbons, phenyl, hydroxy, halogen or alkoxy having 1 to 9 carbons; m is an integer of 1 to 3; n" indicating a repeating unit number is an integer of 0 to 50 whose average is 0 to 15, provided when an average of n" as a repeating unit number is zero, the formula represents a bisphenol compound; and a naphthol aralkyl resin represented by general formula (10');

(8')

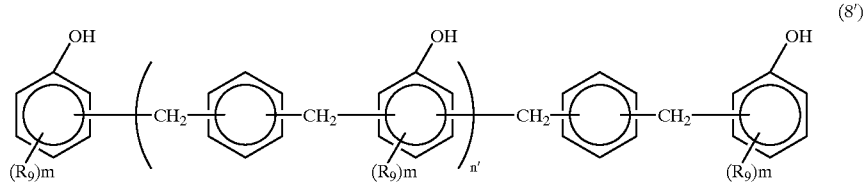

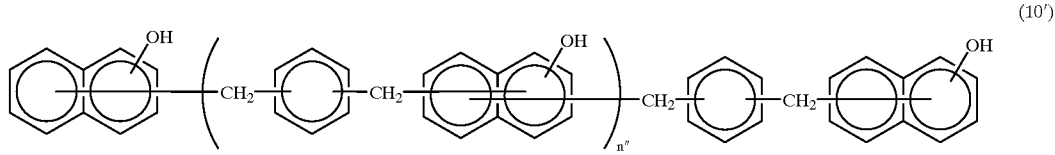

(10')

where n" indicating a repeating unit number is an integer of 0 to 50 whose average is 0 to 15, provided when an average of n" as a repeating unit number is zero, the formula represents a bisphenol compound;

These phenol resins may be esterified by a known process which will be specifically described below.

Esterification agents which may be used for esterifying the above hydroxy group include organic carboxylic anhydrides, organic carboxylic acid halides and organic carboxylic acids, which may be appropriately selected depending on their properties in the light of carbon numbers of an ester to be produced. Specific esterification agents may include acetic anhydride, acetyl chloride, acetyl bromide, acetic acid, propionic anhydride, propionyl chloride, propionyl bromide, propionic acid, butyric anhydride, butyryl chloride, butyric acid, valeric anhydride, valeryl chloride, valeryl bromide, valeric acid, pivalyl chloride, pivalic acid, phenylacetyl chloride, phenylacetic acid, 2-phenylpropionic acid, 3-phenylpropionic acid, o-tolylacetic acid, m-tolylacetic acid, p-tolylacetic acid, cumeic acid, 2-phenylbutyric acid, 4-phenylbutyric acid, benzoic anhydride, benzoyl chloride, benzoyl bromide, benzoic acid, o-methylbenzoyl chloride, m-methylbenzoyl chloride, p-methylbenzoyl chloride, o-methylbenzoic acid, m-methylbenzoic acid, p-methylbenzoic acid, 2,3-dimethylbenzoic acid, 2,4-dimethylbenzoic acid, 2,5-dimethylbenzoic acid, 2,6-dimethylbenzoic acid, 3,4-dimethylbenzoic acid and 3,5-dimethylbenzoic acid; preferably acetic anhydride, acetyl chloride, benzoic anhydride and benzoyl chloride, which may be used alone or in combination of two or more as appropriate.

The amount of the esterification agent may be at least 10 mol % of hydroxy groups to be treated. Its upper limit is not specifically restricted and excessive esterification agent may be removed at the end of the reaction, but it is below 10-fold moles, preferably 5-fold moles, more preferably below 3-fold moles in the light of practical factors such as a reaction volume efficiency and cost.

A specific reaction may vary, depending on the type of the esterification agent; for example, an organic carboxylic anhydride may be reacted as usual.

In brief, an appropriate amount of organic carboxylic anhydride to be esterified is reacted with a hydroxy compound and an organic carboxylic acid as a byproduct and the excessive organic carboxylic anhydride are removed by an appropriate procedure such as atmospheric distillation, vacuum distillation, washing with water and washing with a weak base, e.g., carbonate, or combination thereof, to give a desired esterified compound.

For partial esterification, an organic carboxylic anhydride may be used in an appropriate amount, specifically at least 10 mol % in this invention, to hydroxy to be treated, while for complete esterification, it may used in an equal or more molar amount to hydroxy to be treated, whose upper limit may not be restricted when used as a solvent, but may be up to 10-fold mol in the light of an economic efficiency and a volumetric efficiency of the reaction. The amount may be similar in a reaction later described where an organic carboxylic acid is used.

In general, an esterification reaction is often conducted in the presence of an inert organic base such as pyridine, piperidine and triethylamine. When an epoxy-resin composition of this invention is to be used for an electric or electronic application such as sealing a semiconductor integrated circuit, it is, however, recommended to prevent such a nitrogen-containing organic base from remaining in the system. It may be, therefore, desirable to finally introduce a water-rinsing process. However, since the reaction may be sufficiently completed without such an organic base, it is most desirable to conduct the reaction without any organic base in this invention.

A reaction temperature is 60 to 200° C., preferably 80 to 180° C., in particular 100 to 160° C.

A reaction time may significantly vary depending on types of reactants and a reaction temperature, but may be generally 1 to 25 hours. It may be practically recommended to determine an end point while following consumption of an esterification agent or hydroxy by an appropriate method such as high performance liquid chromatography and gas chromatography.

In the reaction, a solvent may be used or not. The reaction can be conducted neat, when a hydroxy-containing material may be adequately fused at a reaction temperature as well as an esterification agent is a liquid or can be dissolved in the resin at the reaction temperature without adversely affecting the reaction.

If necessary, any solvent which is inert to the reaction may be used; for example, aromatic hydrocarbons such as benzene, toluene, xylenes, chlorobenzene, o-dichlorobenzene and diphenyl ether; aprotic polar solvents such as N,N-dimethylformamide, N,N-dimethylacetamide, N-methyl-2-pyrrolidone, N,N-dimethyl-2-imidazolidinone, dimethyl sulfoxide and sulfolane; ethers such as tetrahydrofuran, dioxane, ethyleneglycol dimethyl ether and diethyleneglycol dimethyl ether; and ketones such as acetone, methyl ethyl ketone and methyl isobutyl ketone, which may be used alone or in any appropriate combination.

The reaction may be conducted under an ambient, increased (in an autoclave) or reduced pressure, and in the air or in an atmosphere of an inert gas such as nitrogen, argon and helium, preferably nitrogen.

There will be described a reaction when an organic carboxyl halide is used as an esterification agent, wherein common procedures may be also used.

Hydroxy may be reacted with an organic carboxylic halide in an appropriate amount to achieve a desired degree of esterification. In the reaction, hydrogen halide as a byproduct may be trapped in the reaction system by a sufficient amount of base which is inert to the reaction, such as pyridine, piperidine and triethylamine, or may be immediately, as a gas, discharged from the system during the reaction to be trapped by a water or alkali trap placed outside of the reaction system. The latter alternative where the hydrogen halide gas is immediately discharged from the system may be preferable for avoiding contamination with a nitrogen-containing or ionic compound as described above.

It may be more preferable to conduct the reaction under a stream of a gas inert to the reaction.

For partial esterification, an organic carboxyl halide may be used in an appropriate amount to hydroxy to be treated, specifically at least 10 mol % since a compound at least 10 mol % of which has been esterified is used in this invention, while for complete esterification, it may used in an equal or slightly more molar amount to hydroxy to be treated. It may be used in a largely excessive amount without limitations, but in the light of an economic efficiency, a volumetric efficiency and complexity in workup after the reaction, may be 10-fold mol, preferably 5-fold mol, more preferably 3-fold mol to hydroxy.

A reaction temperature, use of a solvent in the reaction and a type of the reaction may be as described above for an organic carboxylic anhydride.

When an organic carboxylic acid is used as an esterification agent, a procedure may be as described above for an organic carboxylic anhydride, and in addition the reaction needs an acid catalyst; for example, in organic acids such as hydrochloric acid, sulfuric acid, phosphoric acid and polyphosphoric acid; organic sulfonic acids such as p-toluenesulfonic acid, methanesulfonic acid, ethanesulfonic acid, dimethylsulfonic acid and diethylsulfonic acid; superacids such as trifluoromethanesulfonic acid; acidic ion-exchange resins such as alkanesulfonic acid resins; and superacid type of ion-exchange resins such as perfluoroalkanesulfonic acid resin.

The amount of the acid catalyst may be, to the weight of the reactants, 0.00001 to 5 wt %, preferably 0.0001 to 1 wt %, more preferably 0.001 to 0.1 wt % for a superacid; 1 to 100 wt %, preferably 10 to 50 wt % for an ion-exchange resin; and 0.01 to 10 wt %, preferably 0.1 to 5 wt % for the others. A lower level may make the reaction too slow to be completed in a practical period, while a higher level may cause side reactions to a significant degree or lead to cost increase, for example, associated with more complex process for removing the catalyst.

There have been described three types of esterification agents. In any case, if it is necessary to give a highly-purified esterified product, a water-washing step may be introduced at the end of the reaction, where a water-washable solvent such as toluene, xylene, methyl isobutyl ketone, methyl ethyl ketone and ethyl acetate may be used and an organic layer may be washed until there is detected no contamination with acidic components or ionic impurities in a washing waste.

In this invention, an esterification rate may be 10 to 100 mol %, preferably 50 to 100 mol %, more preferably 80 to 100 mol %, most preferably 90 to 100 mol %.

An esterified compound with an esterification rate of 10 to 100 mol % thus obtained may be used as a curing agent for an epoxy resin, as is for a conventional phenol resin. Specifically, it may be used as a curing agent for an at least bifunctional epoxy resin to provide a product as a thermosetting resin which may be utilized to those applications using a conventional epoxy-phenol cured product.

Physical properties for a cured product demonstrate that epoxy groups are efficiently reacted with ester groups to give an epoxy-resin cured product of this invention. It may be also supported that a solvent extraction rate is very low for the cured product.

Briefly, for example, when extracting a milled cured product of this invention with a solvent such as acetone, it exhibits an extract rate of below 10 wt %, preferably below 5 wt %, more preferably below 1 wt %.

The most prominent feature of the cured product of this invention is that it has a significantly lower coefficient of moisture absorption than an epoxy-phenol cured product and has considerably excellent flexibility owing to the presence of an ester group. Furthermore, while an epoxy-phenol cured product after curing has hydroxy groups in its structure, hydroxy groups are esterified in the cured product of this invention, leading to improvement in electric properties.

An epoxy resin has been conventionally used in combination with a phenol resin as a curing agent, especially in an application as a sealer. Its performance improvement is significantly related to reduction in its coefficient of moisture absorption. Moisture contained in a resin may be instantly gasified when being suddenly exposed to higher than 200° C. as in IR reflow, to generate force as observed in phreatic explosion. It may cause cracks, which adversely affect a variety of physical properties and may cause peeling of a sealer from a chip in the worst case.

As evident from the above characteristics, this invention may contribute to solving the problem for both low hygroscopicity and crack resistance.

A mix proportion of an epoxy resin/a curing agent may be adjusted such that there exist 0.5 to 1.5 equivalents, preferably 0.7 to 1.3 equivalents of active groups (hydrogen or ester) to epoxy groups, which may be preferably adjusted to provide optimal physical properties of a resulting cured product.

An epoxy resin or curing agent may be used alone or in combination of two or more.

In an epoxy-resin of this invention, phosphine oxide compound, as an essential accelerating agent, may be contained in a proportion of 0.001 to 25 wt % (g/100 g), preferably 0.01 to 15 wt %, more preferably 0.1 to 5 wt % to the entire epoxy-resin composition (the total of the resin components, i.e., the epoxy resin and the curing agent). It corresponds to a molar equivalent of $1.5 \times 10^{-6}$ to $4.5 \times 10^{-2}$ mol/100 g, more preferably $1.5 \times 10^{-5}$ to $2.5 \times 10^{-2}$ mol/100 g, most preferably $1.5 \times 10^{-4}$ to $1.0 \times 10^{-2}$ mol/100 g.

In an epoxy-resin composition of this invention, the phosphine oxide may be used with a common well-known accelerating agent including imidazoles such as 2-methylimidazole, phosphines such as triphenylphosphine, tertiary amines such as triethylamine and diazabicyclo compounds such as 1,8-diazabicyclo(5,4,0)undec-7-ene in an amount of 0.5 to 500 wt % to the phosphine oxide, as long as it does not adversely affect the effects of this invention.

In an epoxy-resin composition of this invention, (D) an organic and/or an inorganic filler or other additive may be, if necessary, added to the epoxy-resin composition.

In particular, when the composition is used as a sealer for a semiconductor circuit, it may desirably contain an organic and/or an inorganic filler for improving its mechanical properties and overall cost reduction, and a coloring agent such as carbon black for preventing malfunction due to light. In addition, it may preferably contain a mold release, a coupling agent and a flame retardant.

The amount of the organic and/or inorganic filler may be 100 to 1900 parts by weight, preferably at least 250 parts by weight, more preferably at least 550 parts per 100 parts by weight of (A)+(B) in the light of moisture resistance of mechanical strength.

Organic and/or inorganic fillers which may be used include powders such as silica, alumina, silicon nitride, silicon carbide, talc, calcium silicate, calcium carbonate, mica, clay and titanium white; and fibers such as glass fiber, carbon fiber and aramid fiber. Among these, suitable fillers for a sealer are crystal silica and/or fused silica, which are preferably sphere or a mixture of sphere and amorphous in the light of their fluidity during molding of the resin composition.

Furthermore, it is preferable to add a variety of additives in an epoxy-resin composition of this invention, in the light of mechanical strength and heat resistance. For example, it may be preferable to use a coupling agent for improving adhesiveness of a resin to an inorganic filler; such a coupling agent may be a silane, titanate, aluminate or zircoaluminate coupling agent, preferably a silane coupling agent; particularly a silane coupling agent having a functional group capable of reacting an epoxy group.

Specific coupling agents which may be used include vinyltrimethoxysilane, vinyltriethoxysilane, N-(2-aminomethyl)-3-aminopropyl-methyl-dimethoxysilane, N-(2-aminoethyl)-3-aminopropyl-trimethoxysilane, 3-aminopropyl-triethoxysilane, 3-anilinopropyl-triethoxysilane, 3-glycidoxypropyl-trimethoxysilane, 3-glycidoxypropyl-methyl-dimethoxysilane, 2-(3,4-epoxycyclohexyl)ethyl-trimethoxysilane, 3-methacryloxypropyl-trimethoxysilane and 3-mercaptopropyl-trimethoxysilane, which may be used alone or in combination of two or more.

Such a coupling agent is preferably pre-immobilized on the surface of the inorganic filler via adsorption or reaction.

An epoxy-resin composition of this invention may be used to seal a semiconductor integrated circuit to give a semiconductor device, commonly by low-pressure transfer molding, but other processes may be used; for example, injection molding, compression molding and cast molding. Furthermore, a special process using a solvent may be employed.

EXAMPLES

This invention will be detailed with reference to, but not limited to, examples.

Preparation Example 1 for a Curing Agent

In a glass vessel equipped with a thermometer, an agitator, a dropping funnel and a reflux condenser was placed 507 g(3 mol) of a phenol aralkyl resin (trade name: Milex XLC-4L, hydroxy equivalent: 169 g/eq; Mitsui Chemical Inc.), and the vessel was heated to an internal temperature of 125° C. While keeping the internal temperature, 336.9 g (3.3 mol) of acetic anhydride was added dropwise under stirring over 2 hours. The reaction was continued at 125° C. for 2 hours, and then the mixture was heated to 140° C. After maturing the reaction at 140 to 150° C. for 2 hours, the excessive acetic anhydride and acetic acid, by-product, was evaporated in vacuo under the condition of up to 150° C./10 mmHg.

The resin thus obtained was dissolved in 1400 g of toluene, washed with warm water at 60 to 70° C. until a washing waste became neutral, and toluene was evaporated under the condition of up to 150° C./5 mmHg to give 609 g of a resin whose hydroxy groups were completely acetylated.

Its melt viscosity (as determined with a cone type of melt-viscometer (ICI); hereinafter, the same is applied) was 3.4 poise at 100° C., 1.0 poise at 125° C. and 0.5 poise at 150° C., and its hydroxy equivalent was more than 3000 g/eq (undetectable).

Preparation Example 2 for a Curing Agent

In a reaction vessel as described in Preparation Example 1 was placed 507 g (3 mol) of a phenol aralkyl resin (trade name: Milex XLC-4L, hydroxy equivalent: 169 g/eq; Mitsui Chemical Inc.), and the vessel was heated to an internal temperature of 125° C. While keeping the internal temperature, 245.0 g of acetic anhydride (2.4 mol) was added dropwise under stirring over 2 hours, and then the mixture was treated as described in Preparation Example 1 to give 590 g of a resin, 80 mol % of whose hydroxy groups were acetylated.

Its melt viscosity was 1.2 poise at 125° C. and 0.7 poise at 150° C., and its hydroxy equivalent was 880 g/eq.

Preparation Example 3 for a Curing Agent

In a reaction vessel as described in Preparation Example 1 was placed 507 g (3 mol) of a phenol aralkyl resin (trade name: Milex XLC-4L, hydroxy equivalent: 169 g/eq; Mitsui Chemical Inc.), and the vessel was heated to an internal temperature of 125° C. While keeping the internal temperature, 153.1 g of acetic anhydride (1.5 mol) was added dropwise under stirring over 2 hours, and then the mixture was treated as described in Preparation Example 1 to give 561 g of a resin, 50 mol % of whose hydroxy groups were acetylated.

Its melt viscosity was 2.0 poise at 125° C. and 1.1 poise at 150° C., and its hydroxy equivalent was 359 g/eq.

Preparation Example 4 for a Curing Agent

In a reaction vessel as described in Preparation Example 1 was placed 507 g (3 mol) of a phenol aralkyl resin (trade name: Milex XLC-4L, hydroxy equivalent: 169 g/eq; Mitsui Chemical Inc.), and the vessel was heated to an internal temperature of 125° C. While keeping the internal temperature, 23.6 g of acetyl chloride (0.3 mol) was added dropwise under stirring over 1 hours. The reaction was continued at 125° C. for 2 hours and then the mixture was heated to 140° C.

The reaction system became red due to hydrogen chloride as a byproduct. The reaction mixture was matured at 140 to 150° C. for 2 hours, heated to 160° C. and was slightly vacuumed with a tap aspirator to become slightly yellowish and clear as was before the reaction. Hydrogen chloride as a byproduct was exhausted from the top of the reflux condenser outside the system and trapped by an alkali trap via an inlet tube.

The resulting resin was removed to give 520 g of a resin, 10 mol % of whose hydroxy groups were acetylated.

Its melt viscosity was 2.0 poise at 125° C. and 1.1 poise at 150° C., and its hydroxy equivalent was 192 g/eq.

Preparation Example 5 for a Curing Agent

In a reaction vessel as described in Preparation Example 1 was placed 507 g (3 mol) of a phenol aralkyl resin (trade name: Milex XLC-4L, hydroxy equivalent: 169 g/eq; Mitsui Chemical Inc.), and the vessel was heated to an internal temperature of 125° C. While keeping the internal temperature, 464.0 g of benzoyl chloride (3.3 mol) was added dropwise under stirring over 4 hours. The reaction was continued at 125° C. for 2 hours. Then, the mixture was heated to 150° C. and was matured at 150 to 155° C. for 2 hours. Hydrogen chloride as a byproduct was immediately exhausted outside the system by a nitrogen stream and trapped by an alkali trap for neutralization.

The resulting resin was dissolved in 2500 g of toluene and washed with 300 g of 5% sodium hydroxide aq. The organic layer was separated and was washed with warm water at 60 to 70° C. until the organic layer became neutral. Toluene was evaporated under the condition of up to 150° C./5 mmHg, to give 810 g of a resin whose hydroxy groups were completely benzoylated.

Its melt viscosity was 4.8 poise at 125° C. and 1.3 poise at 150° C., and its hydroxy equivalent was more than 3000 g/eq (undetectable).

Preparation Example 6 for a Curing Agent

In a reaction vessel as described in Preparation Example 1 was placed 507 g (3 mol) of a phenol aralkyl resin (trade name: Milex XLC-4L, hydroxy equivalent: 169 g/eq; Mitsui Chemical Inc.) and 610.8 g of benzoic anhydride(2.7 mol), and the vessel was gradually heated to 125° C. over 2 hours while stirring was initiated when it became possible. Then, the mixture was reacted at 125° C. for 2 hours and heated to 150° C. The reaction mixture was matured at 150 to 155° C. for 2 hours and cooled to 110° C. To the reaction mixture was added 2500 g of methyl isobutyl ketone to give a homogeneous solution.

Benzoic acid as a byproduct was neutralized with 2000 g of 10% sodium carbonate aq. The organic layer was washed with warm water at 60 to 70° C. until a washing waste became neutral. Methyl isobutyl ketone was evaporated under the condition of up to 150° C./5 mmHg, to give 783 g of a resin, 90 mol % of whose hydroxy groups were benzoylated.

Its melt viscosity was 5.2 poise at 125° C. and 1.5 poise at 150° C., and its hydroxy equivalent was 1780 g/eq.

Preparation Example 7 for a Curing Agent

In a reaction vessel as described in Preparation Example 1 was placed 507 g (3 mol) of a phenol aralkyl resin (trade name: Milex XLC-4L, hydroxy equivalent: 169 g/eq; Mitsui Chemical Inc.), and the vessel was heated to an internal temperature of 125° C. While keeping the internal temperature, 348.5 g of benzoyl chloride (2.55 mol) was added dropwise under stirring over 4 hours. The reaction was continued at 125° C. for 2 hours. Then, the mixture was heated to 150° C. and was matured at 150 to 155° C. for 2 hours. Hydrogen chloride as a byproduct was immediately exhausted outside the system by a nitrogen stream and trapped by an alkali trap for neutralization.

The resulting resin was dissolved in 2500 g of toluene and washed with warm water at 60to 70° C. Toluene was evaporated under the condition of up to 150° C./5 mmHg, to give 779 g of a resin, 85% of whose hydroxy groups were benzoylated.

Its melt viscosity was 4.9 poise at 125° C. and 1.4 poise at 150° C., and its hydroxy equivalent was 1420 g/eq.

Preparation Example 8 for a Curing Agent

In a reaction vessel as described in Preparation Example 1 was placed 507 g (3 mol) of a phenol aralkyl resin (trade name: Milex XLC-4L, hydroxy equivalent: 169 g/eq; Mitsui Chemical Inc.) and 339.3 g of benzoic anhydride (1.5 mol), and the vessel was gradually heated to 125° C. over 2 hours while stirring was initiated when it became possible. Then, the mixture was reacted at 125° C. for 2 hours and heated to 150° C. The reaction mixture was matured at 150 to 155° C. for 2 hours and cooled to 110° C. To the reaction mixture was added 2500 g of methyl isobutyl ketone to give a homogeneous solution.

Benzoic acid as a byproduct was neutralized with 2000 g of 5% sodium carbonate aq. The organic layer was washed with warm water at 60 to 70° C. until a washing waste became neutral. Methyl isobutyl ketone was evaporated under the condition of up to 150° C./5 mmHg, to give 659 g of a resin, 50 mol % of whose hydroxy groups were benzoylated.

Its melt viscosity was 5.7 poise at 125° C. and 1.6 poise at 150° C., and its hydroxy equivalent was 390 g/eq.

Preparation Example 9 for a Curing Agent

In a reaction vessel as described in Preparation Example 1 was placed 507 g (3 mol) of a phenol aralkyl resin (trade name: Milex XLC-4L, hydroxy equivalent: 169 g/eq; Mitsui Chemical Inc.), and the vessel was heated to an internal temperature of 125° C. While keeping the internal temperature, 84.3 g of benzoyl chloride (0.6 mol) was added dropwise under stirring over 2 hours. The reaction was continued at 125° C. for 2 hours. Then, the mixture was heated to 150° C. and was matured at 150 to 155° C. for 2 hours. Hydrogen chloride as a byproduct was immediately exhausted outside the system by a nitrogen stream and trapped by an alkali trap for neutralization.

The resulting resin was dissolved in 2500 g of toluene and washed with warm water at 60to 70° C. Toluene was evaporated under the condition of up to 150° C./5 mmHg, to give 565 g of a resin, 20% of whose hydroxy groups were benzoylated.

Its melt viscosity was 6.0 poise at 125° C. and 1.8 poise at 150° C., and its hydroxy equivalent was 232 g/eq.

Preparation Example 10 for a Curing Agent

In a reaction vessel as described in Preparation Example 1 was placed 507 g (3 mol) of a phenol aralkyl resin (trade name: Milex XLC-4L, hydroxy equivalent: 169 g/eq; Mitsui Chemical Inc.), and the vessel was heated to an internal temperature of 125° C. While keeping the internal temperature, 371.2 g of benzoyl chloride (2.64 mol) was added dropwise under stirring over 4 hours. The reaction was continued at 125° C. for 2 hours. Then, the mixture was heated to 150° C. and was matured at 150 to 155° C. for 2 hours. Hydrogen chloride as a byproduct was immediately exhausted outside the system by a nitrogen stream and trapped by an alkali trap for neutralization.

The resulting resin was dissolved in 2500 g of toluene and washed with warm water at 60 to 70° C. Toluene was evaporated under the condition of up to 150° C./5 mmHg, to give 779 g of a resin, 88% of whose hydroxy groups were benzoylated.

Its melt viscosity was 4.9 poise at 125° C. and 1.4 poise at 150° C., and its hydroxy equivalent was 1450 g/eq.

Preparation Example 11 for a Curing Agent

A resin, whose hydroxy groups were completely acetylated (435 g) was prepared as described in Preparation Example 1, except that the phenol aralkyl resin was replaced with 312 g of a phenol novolac resin (trade name: BRG#558, hydroxy equivalent: 104 g/eq; Showa Kobunshi)(3 mol).

Its melt viscosity was 3.4 poise at 100° C., 1.0 poise at 125° C. and 0.5 poise at 150° C., and its hydroxy equivalent was more than 3000 g/eq (undetectable).

Preparation Example 12 for a Curing Agent

In a reaction vessel as described in Preparation Example 1 was placed 312 g of a phenol novolac resin (trade name: BRG#558, hydroxy equivalent: 104 g/eq; Showa Kobunshi)(3 mol) and 500 g of chlorobenzene, and the vessel was heated to an internal temperature of 50° C. The internal temperature was maintained to give a homogeneous solution. Acetyl chloride (188.4 g, 2.4 mol) was added dropwise under stirring over 2 hours. The reaction was continued at 50 to 55° C. for 10 hours. Hydrogen chloride as a byproduct was immediately exhausted outside the system by a nitrogen stream and neutralized by an alkali trap.

At the end of the reaction, chlorobenzene was completely evaporated under the condition of up to 150° C./10 mmHg.

The resulting resin was dissolved in 1400 g of toluene and washed with warm water at 60 to 70° C. Toluene was evaporated under the condition of up to 150° C./5 mmHg, to give 410 g of a resin, 80 mol % of whose hydroxy groups were acetylated.

Its melt viscosity was 1.2 poise at 125° C. and 0.7 poise at 150° C., and its hydroxy equivalent was 554 g/eq.

Preparation Example 13 for a Curing Agent

A resin, whose hydroxy groups were completely benzoylated (618 g) was prepared as described in Preparation Example 5, except that the phenol aralkyl resin was replaced with 312 g of a phenol novolac resin (trade name: BRG#558, hydroxy equivalent: 104 g/eq; Showa Kobunshi)(3 mol).

Its melt viscosity was 4.9 poise at 125° C. and 1.5 poise at 150° C., and its hydroxy equivalent was more than 3000 g/eq (undetectable).

Preparation Example 14 for a Curing Agent

A resin, 90 mol % of whose hydroxy groups were benzoylated (588 g) was prepared as described in Preparation Example 6, except that the phenol aralkyl resin was replaced with 312 g of a phenol novolac resin (trade name: BRG#558, hydroxy equivalent: 104 g/eq; Showa Kobunshi)(3 mol).

Its melt viscosity was 5.2 poise at 125° C. and 1.7 poise at 150° C., and its hydroxy equivalent was 1134 g/eq.

Preparation Example 15 for a Curing Agent

In a reaction vessel as described in Preparation Example 1 was placed 312 g of a phenol novolac resin (trade name: BRG#558, hydroxy equivalent: 104 g/eq; Showa Kobunshi)(3 mol), and the vessel was heated to an internal temperature of 125° C. While keeping the internal temperature, 371.2 g of benzoyl chloride (2.64 mol) was added dropwise under stirring over 4 hours. The reaction was continued at 125° C. for 2 hours. Then, the mixture was heated to 150° C. and was matured at 150 to 155° C. for 2 hours. Hydrogen chloride as a byproduct was immediately exhausted outside the system by a nitrogen stream and neutralized by an alkali trap.

The resulting resin was dissolved in 2500 g of toluene and washed with warm water at 60 to 70° C. Toluene was evaporated under the condition of up to 150° C./5 mmHg, to give 580 g of a resin, 88 mol % of whose hydroxy groups were benzoylated.

Its melt viscosity was 4.8 poise at 125° C. and 1.5 poise at 150° C., and its hydroxy equivalent was 958 g/eq.

Preparation Example 16 for a Curing Agent

A resin, 50 mol % of whose hydroxy groups were benzoylated (468 g) was prepared as described in Preparation Example 8, except that the phenol aralkyl resin was replaced with 312 g of a phenol novolac resin (trade name: BRG#558, hydroxy equivalent: 104 g/eq; Showa Kobunshi)(3 mol).

Its melt viscosity was 5.5 poise at 125° C. and 1.8 poise at 150° C., and its hydroxy equivalent was 260 g/eq.

Preparation Example 17 for a Curing Agent

A resin, whose hydroxy groups were completely acetylated (679 g) was prepared as described in Preparation Example 1, except that the phenol aralkyl resin was replaced with 555 g of a phenol-dicyclopentadiene resin (trade name: DPR#3000, hydroxy equivalent: 185 g/eq; Mitsui Chemical Inc.)(3 mol).

Its melt viscosity was 2.0 poise at 125° C. and 1.1 poise at 150° C., and its hydroxy equivalent was more than 3000 g/eq (undetectable).

Preparation Example 18 for a Curing Agent

In a reaction vessel as described in Preparation Example 1 was placed 555 g of a phenol-dicyclopentadiene resin (trade name: DPR#3000, hydroxy equivalent: 185 g/eq; Mitsui Chemical Inc.) (3 mol) and 1500 g of toluene, and the vessel was heated to an internal temperature of 50° C. The internal temperature was maintained to give a homogeneous solution. Acetyl chloride (111.8 g, 1.5 mol) was added dropwise under stirring over 2 hours. The reaction was continued at 50 to 55° C. for 12 hours. Hydrogen chloride as a byproduct was immediately exhausted outside the system by a nitrogen stream and neutralized by an alkali trap.

At the end of the reaction, the mixture was washed with warm water at 60 to 70° C. Toluene was evaporated under the condition of up to 150° C./5 mmHg, to give 610 g of a resin, 50 mol % of whose hydroxy groups were acetylated.

Its melt viscosity was 1.2 poise at 125° C. and 0.7 poise at 150° C., and its hydroxy equivalent was 391 g/eq.

Preparation Example 19 for a Curing Agent

A resin, whose hydroxy groups were completely benzoylated (866 g) was prepared as described in Preparation Example 5, except that the phenol aralkyl resin was replaced with 555 g of a phenol-dicyclopentadiene resin (trade name: DPR#3000, hydroxy equivalent: 185 g/eq; Mitsui Chemical Inc.)(3 mol).

Its melt viscosity was 2.6 poise at 125° C. and 1.1 poise at 150° C., and its hydroxy equivalent was more than 3000 g/eq (undetectable).

Preparation Example 20 for a Curing Agent

A resin, 90% of whose hydroxy groups were benzoylated (830 g) was prepared as described in Preparation Example 6, except that the phenol aralkyl resin was replaced with 555 g of a phenol-dicyclopentadiene resin (trade name: DPR#3000, hydroxy equivalent: 185 g/eq; Mitsui Chemical Inc.)(3 mol).

Its melt viscosity was 3.4 poise at 125° C. and 1.6 poise at 150° C., and its hydroxy equivalent was 1944 g/eq.

Preparation Example 21 for a Curing Agent

A resin, 88% of whose hydroxy groups were benzoylated (822 g) was prepared as described in Preparation Example 1, except that the phenol aralkyl resin was replaced with 555 g of a phenol-dicyclopentadiene resin (trade name: DPR#3000, hydroxy equivalent: 185 g/eq; Mitsui Chemical Inc.)(3 mol).

Its melt viscosity was 2.6 poise at 125° C. and 1.0 poise at 150° C., and its hydroxy equivalent was 1633 g/eq.

Preparation Example 22 for a Curing Agent

A resin, 40% of whose hydroxy groups were benzoylated (675 g) was prepared as described in Preparation Example 20, except that the amount of benzoic anhydride was 271.4 g (1.2 mol).

Its melt viscosity was 3.4 poise at 125° C. and 1.7 poise at 150° C., and its hydroxy equivalent was 349.9 g/eq.

Preparation Example 23 for a Curing Agent

A resin, whose hydroxy groups were completely acetylated (760 g) was prepared as described in Preparation Example 1, except that the phenol aralkyl resin was replaced with 639 g (3 mol) of a naphthol aralkyl resin (trade name: α-NX-3.2, hydroxy equivalent: 213 g/eq; Mitsui Chemical Inc.).

Its melt viscosity was 2.0 poise at 125° C. and 1.1 poise at 150° C., and its hydroxy equivalent was more than 3000 g/eq (undetectable).

Preparation Example 24 for a Curing Agent

A resin, 50 mol % of whose hydroxy groups were acetylated (695 g) was prepared as described in Preparation Example 18, except that the phenol-dicyclopentadiene resin was replaced with 639 g (3 mol) of a naphthol aralkyl resin (trade name: α-NX-3.2, hydroxy equivalent: 213 g/eq; Mitsui Chemical Inc.).

Its melt viscosity was 1.2 poise at 125° C. and 0.7 poise at 150° C., and its hydroxy equivalent was 447 g/eq.

Preparation Example 25 for a Curing Agent

A resin, whose hydroxy groups were completely benzoylated (946 g) was prepared as described in Preparation Example 5, except that the phenol aralkyl resin was replaced with 639 g (3 mol) of a naphthol aralkyl resin (trade name: α-NX-3.2, hydroxy equivalent: 213 g/eq; Mitsui Chemical Inc.).

Its melt viscosity was 4.9 poise at 125° C. and 1.8 poise at 150° C., and its hydroxy equivalent was more than 3000 g/eq (undetectable).

Preparation Example 26 for a Curing Agent

A resin, 90 mol % of whose hydroxy groups were benzoylated (912 g) was prepared as described in Preparation Example 6, except that the phenol aralkyl resin was replaced with 639 g (3 mol) of a naphthol aralkyl resin (trade name: α-NX-3.2, hydroxy equivalent: 213 g/eq; Mitsui Chemical Inc.).

Its melt viscosity was 5.2 poise at 125° C. and 2.1 poise at 150° C., and its hydroxy equivalent was 2224 g/eq.

Preparation Example 27 for a Curing Agent

A resin, 88 mol % of whose hydroxy groups were benzoylated (910 g) was prepared as described in Preparation Example 10, except that the phenol aralkyl resin was replaced with 639 g (3 mol) of a naphthol aralkyl resin (trade name: α-NX-3.2, hydroxy equivalent: 213 g/eq; Mitsui Chemical Inc.).

Its melt viscosity was 5.0 poise at 125° C. and 1.9 poise at 150° C., and its hydroxy equivalent was 1867 g/eq.

Preparation Example 28 for a Curing Agent

A resin, 50 mol % of whose hydroxy groups were benzoylated (790 g) was prepared as described in Preparation Example 8, except that the phenol aralkyl resin was replaced with 639 g (3 mol) of a naphthol aralkyl resin (trade name: α-NX-3.2, hydroxy equivalent: 213 g/eq; Mitsui Chemical Inc.).

Its melt viscosity was 5.2 poise at 125° C. and 2.1 poise at 150° C., and its hydroxy equivalent was 478 g/eq.

Example 1

One gram equivalent of bisphenol-A type of diglycidyl ether (trade name: Epicoat 828, Yuka Shell Epoxy, epoxy equivalent: 184 g/eq) and the acetylated phenol aralkyl resin from Preparation Example 1 (estimated ester equivalent= 211 g/eq.) as an epoxy resin and a curing agent, respectively, were melted and kneaded at 80° C. to give a homogeneous resin mixture.

To the resin composition was added 0.055 mol of a phosphine oxide represented by general formula (1) where all of $R_1$ to $R_6$ are methyl (hereinafter, referred to as "PZO"), and the mixture was kneaded at 50° C. for 1 min to give a resin composition.

To 200 g of the resin component were blended a filler and other additives in the following proportions, and the mixture was heated and kneaded with a roll to give a molding material for a sealer.

Inorganic filler: 720 g
[a mixture of 50 parts by weight of sphere fused silica (Halimic S-CO, Micron) and 50 parts by weight of amorphous fused silica (Fusedrex RD-8, Tatsumori)]
Silane coupling agent: 62 g
(SZ-6083, Toray Dow Corning Silicone)
Carnauba wax 45 g
Carbon black: 3 g
Antimony oxide: 10 g A portion of the molding material thus prepared was cured under the conditions of 150° C.→185° C./5 min, 185° C./5 min and 150 kg/cm², and was subjected to after-curing under the condition of 185° C./8 hr in an atmosphere of nitrogen to be adequately cured.

Various physical properties were determined for the cured product. The same molding material was used to prepare a semiconductor device for testing, by low-pressure transfer molding. It was then subject to a crack initiation test using a solder bath.

The results are shown in Table 1.

A gel time for a resin composition before roll kneading was determined at 150° C. (hereinafter, the same is applied).

TABLE 1

| Example | 1 | 2 | 3 | 4 | 5 | 6 | 7 | 8 |
|---|---|---|---|---|---|---|---|---|
| Proportion (wt arts) Main ingredients | | | | | | | | |
| Epicoat 828 | 184 | | | | 184 | | | |
| E1031S | | 189 | | | | 189 | | |
| EOCN 7000 | | | 204 | | | | 204 | |
| SPIDG | | | | 233 | | | | 233 |
| Curing agents | | | | | | | | |
| Prep. Exam. 1 | 211 | ← | ← | ← | | | | |
| Prep. Exam. 5 | | | | | 273 | ← | ← | ← |

TABLE 1-continued

| Example | 1 | 2 | 3 | 4 | 5 | 6 | 7 | 8 |
|---|---|---|---|---|---|---|---|---|
| Accelerating agent | | | | | | | | |
| PZO (mol) | 0.0055 | ← | ← | ← | ← | ← | ← | ← |
| Physical properties | | | | | | | | |
| Glass-transition temperature (° C.) | 110 | 111 | 113 | 114 | 114 | 115 | 113 | 117 |
| Flexural strength (Kgf/mm$^2$) | 12.2 | 12.4 | 12.4 | 12.6 | 12.2 | 12.4 | 12.4 | 12.6 |
| Bend elastic const. (Kgf/mm$^2$) | 1650 | 1640 | 1620 | 1610 | 1450 | 1440 | 1420 | 1410 |
| Boiling water absorption (%) | 0.09 | 0.09 | 0.09 | 0.08 | 0.09 | 0.09 | 0.09 | 0.08 |
| VPS test (cracked/10) | 0 | 0 | 0 | 0 | 0 | 0 | 0 | 0 |
| Gel time (min, sec) | 5'23" | 5'28" | 5'42" | 5'42" | 5'23" | 5'28" | 5'42" | 5'41" |

Example 2

A molding material for a sealer was prepared as described in Example 1, except that a tetraphenylolethane type of epoxy resin represented by formula (12) (trade name: E1031S, Yuka Shell Epoxy, epoxy equivalent: 189 g/eq) was used as an epoxy resin.

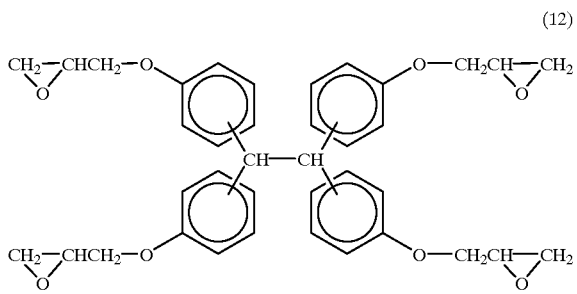

(12)

The material was processed as described in Example 1 for determining physical properties of a cured product and for a crack test for a test semiconductor device.

The results are shown in Table 1.

Example 3

A molding material for a sealer was prepared as described in Example 1, except that a naphthol-cresol resol condensate type of epoxy resin represented by formula (13) (trade name: EOCN7000, Nihon Kayaku, epoxy equivalent: 204 g/eq) was used as an epoxy resin.

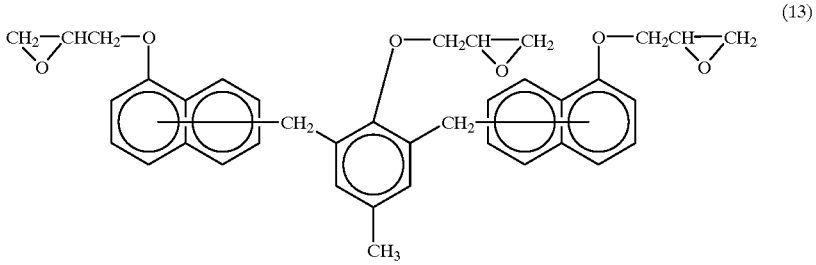

(13)

The material was processed as described in Example 1 for determining physical properties of a cured product and for a crack test for a test semiconductor device.

The results are shown in Table 1.

Example 4

A molding material for a sealer was prepared as described in Example 1, except that a spirobiindane diphenol type of epoxy resin represented by formula (14) (trade name: SPIDG, Mitsui Chemical Inc., epoxy equivalent: 233 g/eq) was used as an epoxy resin.

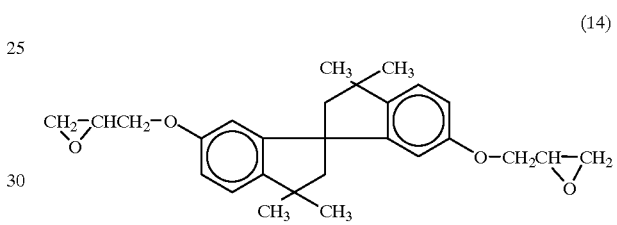

(14)

The material was processed as described in Example 1 for determining physical properties of a cured product and for a crack test for a test semiconductor device.

The results are shown in Table 1.

Examples 5 to 8

Molding materials for a sealer was prepared as described in Examples 1 to 4, except that a curing agent was the benzoylated phenol aralkyl resin from Preparation Example 5 and a molar ratio of epoxy/functional groups (hydroxy+ ester) was 1/1.

The materials were processed as described in Examples 1 to 4 for determining physical properties of a cured product and for a crack test for a test semiconductor device.

The results are shown in Table 1.

Comparative Examples 1 to 4

We attempted to prepare molding materials as described in Examples 1 to 4 using an unesterified phenol aralkyl resin (trade name: Milex XLC-4L; Mitsui Chemical Inc., hydroxy equivalent: 169 g/eq) as a curing agent and triphenylphosphine (TPP) as an accelerating agent, but the compositions exhibited too poor curing properties to allow a gel time to be determined or a molding to be prepared. Therefore, TPP was increased to 0.015 mol for determining a gel time.

The results are shown in Table 2.

Consequently, gel times were reduced to a similar level to those in Examples. Thus, molding materials for a sealer were prepared as described in Examples.

The materials were processed as described in Examples 1 to 4 for determining physical properties of a cured product and for a crack test for a test semiconductor device.

The results are shown in Table 2.

0.015 mol. We have attempted to prepare moldings, using the materials, which were, however, flown out before curing and moldings were not formed.

Then, we have attempted to determine their gel times, but they failed to gel at 150° C. or 200° C. in 15 min. Thus, the determination was discontinued (Table 3).

TABLE 2

| Comp. Example | 1 | 2 | 3 | 4 | 5 | 6 | 7 | 8 |
|---|---|---|---|---|---|---|---|---|
| Proportion (wt parts) Main ingredients | | | | | | | | |
| Epicoat 828 | 184 | | | | 184 | | | |
| E1031S | | 189 | | | | 189 | | |
| EOCN 7000 | | | 204 | | | | 204 | |
| SPIDG | | | | 233 | | | | 233 |
| Curing agent | | | | | | | | |
| XLC-4L | 169 | ← | ← | ← | ← | ← | ← | ← |
| Accelerating agents | | | | | | | | |
| TPP (mol) | 0.015 | ← | ← | ← | | | | |
| C11Z (mol) | | | | | 0.015 | ← | ← | ← |
| Physical properties | | | | | | | | |
| Glass-transition temperature (° C.) | 119 | 121 | 122 | 125 | 121 | 122 | 122 | 125 |
| Flexural strength (Kgf/mm$^2$) | 12.2 | 12.4 | 12.4 | 12.6 | 12.8 | 13.0 | 12.2 | 12.4 |
| Bend elastic const. (Kgf/mm$^2$) | 1450 | 1440 | 1420 | 1410 | 1460 | 1450 | 1450 | 1440 |
| Boiling water absorption (%) | 0.13 | 0.15 | 0.16 | 0.12 | 0.13 | 0.15 | 0.15 | 0.13 |
| VPS test (cracked/10) | 1 | 2 | 2 | 1 | 1 | 2 | 2 | 2 |
| Gel time (min, sec) | 4'03" | 3'48" | 3'52" | 4'21" | 3'58" | 3'39" | 3'43" | 4'08" |

Comparative Examples 5 to 8

We attempted to prepare molding materials as described in Examples 1 to 4 using an unesterified phenol aralkyl resin (trade name: Milex XLC-4L; Mitsui Chemical Inc., hydroxy equivalent: 169 g/eq) as a curing agent and 2-undecylimidazole (C11Z) as an accelerating agent, but the compositions exhibited too poor curing properties to allow a gel time to be determined or a molding to be prepared. Therefore, C11Z was increased to 0.015 mol for determining a gel time.

The results are shown in Table 2.

Consequently, gel times were reduced to a similar level to those in Examples. Thus, molding materials for a sealer were prepared as described in Examples.

The materials were processed as described in Examples 1 to 4 for determining physical properties of a cured product and for a crack test for a test semiconductor device.

The results are shown in Table 2.

Comparative Examples 9 to 16

Molding materials as described in Examples 1 to 8 using triphenylphosphine as an accelerating agent in an amount of

TABLE 3

| Comp. Example | 9 | 10 | 11 | 12 | 13 | 14 | 15 | 16 |
|---|---|---|---|---|---|---|---|---|
| Proportion (wt parts) Main ingredients | | | | | | | | |
| Epicoat 828 | 184 | | | | 184 | | | |
| E1031S | | 189 | | | | 189 | | |
| EOCN 7000 | | | 204 | | | | 204 | |
| SPIDG | | | | 233 | | | | 233 |
| Curing agents | | | | | | | | |
| Prep. Exam. 1 | 211 | ← | ← | ← | | | | |
| Prep. Exam. 5 | | | | | 273 | ← | ← | ← |
| Accelerating agent | | | | | | | | |
| TPP (mol) | 0.015 | ← | ← | ← | ← | ← | ← | ← |
| Physical properties | | | | | | | | |
| Glass-transition (° C.) | No cured products | | | | | | | |
| Flexural strength (Kgf/mm$^2$) | | | | | | | | |

TABLE 3-continued

| Comp. Example | 9 | 10 | 11 | 12 | 13 | 14 | 15 | 16 |
|---|---|---|---|---|---|---|---|---|
| Bend elastic const. (Kgf/mm$^2$) | | | | | | | | |
| Boiling water absorption (%) | | | | | | | | |
| VPS test (cracked/10) | | | | | | | | |
| Gel time (min, sec) | | | | | | | | |

Comparative Examples 17 to 24

Molding materials as described in Examples 1 to 8 using 2-undecylimidazole(C11Z) as an accelerating agent in an amount of 0.015 mol. We have attempted to prepare moldings, using the materials, which were, however, flown out before curing and moldings were not formed.

Then, we have attempted to determine their gel times, but they failed to gel at 150° C. or 200° C. in 15 min. Thus, the determination was discontinued (Table 4).

TABLE 4

| Comp. Example | 9 | 10 | 11 | 12 | 13 | 14 | 15 | 16 |
|---|---|---|---|---|---|---|---|---|
| Proportion (wt parts) | | | | | | | | |
| Main ingredients | | | | | | | | |
| Epicoat 828 | 184 | | | | 184 | | | |
| E1031S | | 189 | | | | 189 | | |
| EOCN 7000 | | | 204 | | | | 204 | |
| SPIDG | | | | 233 | | | | 233 |
| Curing agents | | | | | | | | |
| Prep. Exam. 1 | 211 | ← | ← | ← | | | | |
| Prep. Exam. 5 | | | | | 273 | ← | ← | ← |
| Accelerating agent | | | | | | | | |
| C11Z (mol) | 0.015 | ← | ← | ← | ← | ← | ← | ← |
| Physical properties | | | | | | | | |
| Glass-transition temperature (° C.) | | | | No cured products | | | | |
| Flexural strength (Kgf/mm$^2$) | | | | | | | | |
| Bend elastic const. (Kgf/mm$^2$) | | | | | | | | |
| Boiling water absorption (%) | | | | | | | | |
| VPS test (cracked/10) | | | | | | | | |
| Gel time (min, sec) | | | | | | | | |

Examples 9 to 16

Molding materials for a sealer was prepared as described in Example 1, except that an epoxy resin was 2,2',6,6'-tetramethylbiphenol diglycidyl ether (trade name: YX-4000H; Yuka Shell Epoxy, epoxy equivalent: 184 g/eq), a curing agent was one of the acylated phenol resins listed in Table 5, and a molar ratio of epoxy/functional groups (hydroxy+ester) was 1/1.

The materials were processed as described in Example 1 for determining physical properties of a cured product and for a crack test for a test semiconductor device.

The results are shown in Table 5.

TABLE 5

| Example | 9 | 10 | 11 | 12 | 13 | 14 | 15 | 16 |
|---|---|---|---|---|---|---|---|---|
| Proportion (wt parts) | | | | | | | | |
| Main ingredient | | | | | | | | |
| YX4000H | 184 | ← | ← | ← | ← | ← | ← | ← |
| Curing agents | | | | | | | | |
| Prep. Exam. 1 | 211 | | | | | | | |
| Prep. Exam. 5 | | 273 | | | | | | |
| Prep. Exam. 11 | | | 146 | | | | | |
| Prep. Exam. 13 | | | | 208 | | | | |
| Prep. Exam. 17 | | | | | 227 | | | |
| Prep. Exam. 19 | | | | | | 289 | | |
| Prep. Exam. 23 | | | | | | | 255 | |
| Prep. Exam. 25 | | | | | | | | 317 |
| Accelerating agent | | | | | | | | |
| PZO (mol) | 0.0055 | ← | ← | ← | ← | ← | ← | ← |
| Physical properties | | | | | | | | |
| Glass-transition temperature (° C.) | 108 | 100 | 110 | 108 | 106 | 102 | 113 | 105 |
| Flexural strength (Kgf/mm$^2$) | 12.2 | 12.2 | 12.8 | 12.8 | 12.2 | 12.1 | 12.4 | 12.9 |
| Bend elastic const. (Kgf/mm$^2$) | 1650 | 1650 | 1660 | 1660 | 1650 | 1620 | 1620 | 1690 |

TABLE 5-continued

| Example | 9 | 10 | 11 | 12 | 13 | 14 | 15 | 16 |
|---|---|---|---|---|---|---|---|---|
| Boiling water absorption (%) | 0.08 | 0.08 | 0.08 | 0.10 | 0.10 | 0.08 | 0.11 | 0.07 |
| VPS test (cracked/10) | 0 | 0 | 0 | 0 | 0 | 0 | 0 | 0 |
| Gel time (min, sec) | 5'23" | 5'42" | 5'28" | 5'48" | 5'23" | 5'57" | 5'42" | 5'33" |

Examples 17 to 24

Molding materials for a sealer was prepared as described in Example 1, except that an epoxy resin was o-cresol novolac type of epoxy resin (trade name: EOCN-102S; Nihon Kayaku, epoxy equivalent: 210 g/eq), a curing agent was one of the acylated phenol resins listed in Table 6, and a molar ratio of epoxy/functional groups (hydroxy+ester) was 1/1.

The materials were processed as described in Example 1 for determining physical properties of a cured product and for a crack test for a test semiconductor device.

The results are shown in Table 6.

TABLE 6

| Example | 17 | 18 | 19 | 20 | 21 | 22 | 23 | 24 |
|---|---|---|---|---|---|---|---|---|
| Proportion (wt parts) | | | | | | | | |
| Main ingredient | | | | | | | | |
| EOCN102S | 210 | ← | ← | ← | ← | ← | ← | ← |
| Curing agents | | | | | | | | |
| Prep. Exam. 1 | 211 | | | | | | | |
| Prep. Exam. 5 | | 273 | | | | | | |
| Prep. Exam. 11 | | | 146 | | | | | |
| Prep. Exam. 13 | | | | 208 | | | | |
| Prep. Exam. 17 | | | | | 227 | | | |
| Prep. Exam. 19 | | | | | | 289 | | |
| Prep. Exam. 23 | | | | | | | 255 | |
| Prep. Exam. 25 | | | | | | | | 317 |
| Accelerating agent | | | | | | | | |
| PZO (mol) | 0.0055 | ← | ← | ← | ← | ← | ← | ← |
| Physical properties | | | | | | | | |
| Glass-transition temperature (° C.) | 141 | 120 | 156 | 150 | 130 | 119 | 148 | 132 |
| Flexural strength (Kgf/mm$^2$) | 12.4 | 12.3 | 12.1 | 12.7 | 11.7 | 12.3 | 12.1 | 13.1 |
| Bend elastic const. (Kgf/mm$^2$) | 1690 | 1660 | 1570 | 1660 | 1500 | 1640 | 1620 | 1680 |
| Boiling water absorption (%) | 0.08 | 0.13 | 0.09 | 0.17 | 0.06 | 0.11 | 0.07 | 0.11 |
| VPS test (cracked/10) | 0 | 0 | 0 | 0 | 0 | 0 | 0 | 0 |
| Gel time (min, sec) | 4'51" | 5'48" | 4'33" | 5'27" | 5'04" | 5'58" | 5'10" | 5'33" |

Examples 25 to 32

Molding materials for a sealer was prepared as described in Example 1, except that an epoxy resin was 1,6-dihydronaphthalene diglycidyl ether (trade name: Epicron HP4032; Dainihon Ink Chem., epoxy equivalent: 150 g/eq), a curing agent was one of the acylated phenol resins listed in Table 7, and a molar ratio of epoxy/functional groups (hydroxy +ester) was 1/1.

The materials were processed as described in Example 1 for determining physical properties of a cured product and for a crack test for a test semiconductor device.

The results are shown in Table 7.

Examples 33 to 40

Molding materials for a sealer was prepared as described in Example 1, except that an epoxy resin was a phenol aralkyl type of epoxy resin (trade name: E-XLC-LL; Mitsui Chemical Inc., epoxy equivalent: 235 g/eq), a curing agent was one of the acylated phenol resins listed in Table 8, and a molar ratio of epoxy/functional groups (hydroxy+ester) was 1/1.

TABLE 7

| Example | 25 | 26 | 27 | 28 | 29 | 30 | 31 | 32 |
|---|---|---|---|---|---|---|---|---|
| Proportion (wt parts) Main ingredient | | | | | | | | |
| HP4032 | 150 | ← | ← | ← | ← | ← | ← | ← |
| Curing agents | | | | | | | | |
| Prep. Exam. 2 | 203 | | | | | | | |
| Prep. Exam. 6 | | 263 | | | | | | |
| Prep. Exam. 12 | | | 138 | | | | | |
| Prep. Exam. 14 | | | | 198 | | | | |
| Prep. Exam. 18 | | | | | 206 | | | |
| Prep. Exam. 20 | | | | | | 279 | | |
| Prep. Exam. 24 | | | | | | | 234 | |
| Prep. Exam. 26 | | | | | | | | 307 |
| Accelerating agent | | | | | | | | |
| PZO (mol) | 0.0055 | ← | ← | ← | ← | ← | ← | ← |
| Physical properties | | | | | | | | |
| Glass-transition temperature (° C.) | 125 | 119 | 136 | 134 | 125 | 119 | 140 | 125 |
| Flexural strength (Kgf/mm$^2$) | 12.9 | 12.8 | 12.8 | 12.8 | 12.9 | 12.9 | 13.6 | 13.5 |
| Bend elastic const. (Kgf/mm$^2$) | 1620 | 1615 | 1545 | 1555 | 1550 | 1550 | 1610 | 1580 |
| Boiling water absorption (%) | 0.09 | 0.08 | 0.09 | 0.09 | 0.08 | 0.09 | 0.09 | 0.08 |
| VPS test (cracked/10) | 0 | 0 | 0 | 0 | 0 | 0 | 0 | 0 |
| Gel time (min, sec) | 4'38" | 4'42" | 4'20" | 4'25" | 4'21" | 4'45" | 3'29" | 4'52" |

The materials were processed as described in Example 1 for determining physical properties of a cured product and for a crack test for a test semiconductor device.

The results are shown in Table 8.

TABLE 8

| Example | 33 | 34 | 35 | 36 | 37 | 38 | 39 | 40 |
|---|---|---|---|---|---|---|---|---|
| Proportion (wt parts) Main ingredient | | | | | | | | |
| E-XLC-LL | 235 | ← | ← | ← | ← | ← | ← | ← |
| Curing agents | | | | | | | | |
| Prep. Exam. 3 | 190 | | | | | | | |
| Prep. Exam. 7 | | 257 | | | | | | |
| Prep. Exam. 9 | | | 190 | | | | | |
| Prep. Exam. 13 | | | | 208 | | | | |
| Prep. Exam. 15 | | | | | 196 | | | |
| Prep. Exam. 19 | | | | | | 289 | | |
| Prep. Exam. 21 | | | | | | | 277 | |
| Prep. Exam. 27 | | | | | | | | 305 |
| Accelerating agent | | | | | | | | |
| PZO (mol) | 0.0055 | ← | ← | ← | ← | ← | ← | ← |
| Physical properties | | | | | | | | |
| Glass-transition temperature (° C.) | 125 | 125 | 129 | 135 | 137 | 113 | 115 | 130 |
| Flexural strength (Kgf/mm$^2$) | 12.6 | 12.5 | 12.7 | 12.2 | 12.3 | 12.3 | 12.4 | 13.0 |

TABLE 8-continued

| Example | 33 | 34 | 35 | 36 | 37 | 38 | 39 | 40 |
|---|---|---|---|---|---|---|---|---|
| Bend elastic const. (Kgf/mm$^2$) | 1670 | 1670 | 1660 | 1610 | 1590 | 1560 | 1555 | 1650 |
| Boiling water absorption (%) | 0.09 | 0.10 | 0.11 | 0.09 | 0.10 | 0.09 | 0.09 | 0.08 |
| VPS test (cracked/10) | 0 | 0 | 0 | 0 | 0 | 0 | 0 | 0 |
| Gel time (min, sec) | 4'48" | 4'13" | 3'15" | 4'41" | 4'15" | 4'37" | 4'19" | 4'25" |

Examples 41 to 48

Molding materials for a sealer was prepared as described in Example 1, except that an epoxy resin was a phenol-dicyclopentadiene type of epoxy resin (trade name: Epicron HP-7200; Dainihon Ink Chem., epoxy equivalent: 262 g/eq), a curing agent was one of the acylated phenol resins listed in Table 9, and a molar ratio of epoxy/functional groups (hydroxy +ester) was 1/1.

The materials were processed as described in Example 1 for determining physical properties of a cured product and for a crack test for a test semiconductor device.

The results are shown in Table 9.

A gel time for a resin composition before roll kneading was herein determined at 150° C. (hereinafter, the same is applied).

Physical properties were herein determined as follows.

Tg (glass-transition temperature): determined by a TMA needle inserting technique (Shimazu; TMA-DRW DT-30);

Flexural strength, coefficient of elasticity: determined according to JIS K-6911;

Boiling water absorption: determined by measuring a weight increase after heating 2 hours in boiling water at 100° C.;

V.P.S. test: immediately after being placed in a thermo-hygrostat at 85° C. and 85% for 168 hours, test semiconductor devices were soaked in Frolinate liquid (Sumitomo 3M; FC-70) at 240° C. Semiconductors whose package resin had a crack were counted. The results are given as a fraction where a numerator is the number of semiconductors having a crack and a denominator is the number of tested devices.

TABLE 9

| Example | 41 | 42 | 43 | 44 | 45 | 46 | 47 | 48 |
|---|---|---|---|---|---|---|---|---|
| Proportion (wt parts) | | | | | | | | |
| Main ingredient | | | | | | | | |
| HP-7200 | 262 | ← | ← | ← | ← | ← | ← | ← |
| Curing agents | | | | | | | | |
| Prep. Exam. 4 | 173 | | | | | | | |
| Prep. Exam. 8 | | 221 | | | | | | |
| Prep. Exam. 10 | | | 261 | | | | | |
| Prep. Exam. 16 | | | | 156 | | | | |
| Prep. Exam. 21 | | | | | 277 | | | |
| Prep. Exam. 22 | | | | | | 227 | | |
| Prep. Exam. 27 | | | | | | | 305 | |
| Prep. Exam. 28 | | | | | | | | 265 |
| Accelerating agent | | | | | | | | |
| PZO (mol) | 0.0055 | ← | ← | ← | ← | ← | ← | ← |
| Physical properties | | | | | | | | |
| Glass-transition temperature (° C.) | 128 | 125 | 120 | 145 | 118 | 120 | 124 | 128 |
| Flexural strength (Kgf/mm$^2$) | 13.2 | 12.9 | 12.7 | 12.8 | 13.1 | 13.5 | 13.1 | 13.5 |
| Bend elastic const. (Kgf/mm$^2$) | 1530 | 1540 | 1560 | 1525 | 1540 | 1500 | 1550 | 1550 |
| Boiling water absorption (%) | 0.12 | 0.10 | 0.09 | 0.11 | 0.09 | 0.09 | 0.09 | 0.10 |
| VPS test (cracked/10) | 0 | 0 | 0 | 0 | 0 | 0 | 0 | 0 |
| Gel time (min, sec) | 3'28" | 4'06" | 4'42" | 4'01" | 4'47" | 3'57" | 5'25" | 4'05" |

Example 49

The resin composition of Example 17 (epoxy resin/benzoylated phenol aralkyl resin/PZO before kneading an inorganic filler) was cured under the conditions as described in the above Examples, and it was milled with a small mill (Sample Mill, SK-M10 type; Kyoritsu Riko).

The milled powder (30 g) was extracted with 300 g of acetone using a Soxhlet extractor for 2 hours.

After drying up the extract, an extraction ratio of 0.15% was obtained.

As described with reference to examples in detail, an epoxy-resin composition of this invention comprising a phosphine oxide as an essential accelerating agent and an ester-containing compound as a curing agent can give a cured product much more improved in hygroscopicity and flexibility than a conventional epoxy resin-phenol resin cured product, as well as very advantageous as to crack resistance. Thus, it may be understood that it exhibits quite good crack resistance as a sealer for a semiconductor integrated circuit.

As seen in Comparative Examples, a composition comprising a conventional curing catalyst including triphenylphosphine or an imidazole compound fails to give a cured product, i.e., an ester-containing moiety is inadequately cured.

It may be evidenced that an esterified curing agent and a phosphine oxide catalyst are essential for achieving excellent physical properties for a sealer in this invention.

What is claimed is:

1. An epoxy-resin composition comprising (A) an at least bifunctional epoxy compound and/or an at least bifunctional epoxy resin, (B) an at least bifunctional ester-containing compound and/or an at least bifunctional ester-containing resin as a curing agent, 10 to 100% of whose hydroxy groups are esterified with aliphatic or aromatic acyl groups, and (C) an accelerating agent, the accelerating agent essentially containing a phosphine oxide represented by general formula (1):

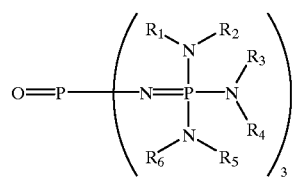

(1)

where $R_1$ to $R_6$ all of which are the same or not are hydrogen, straight, branched or cyclic alkyl having 1 to 10 carbons or aryl or aralkyl having 6 to 10 carbons.

2. An epoxy-resin composition as claimed in claim 1 where (A) the at least bifunctional epoxy compound and/or an at least bifunctional epoxy resin is selected from an epoxy resin derived from a dihydroxynaphthalene represented by general formula (2), an epoxy resin derived from a biphenol represented by general formula (3), an epoxy resin derived from a novolac type of resin represented by general formula (4), an epoxy resin derived from a phenol aralkyl resin represented by general formula (5) and an epoxy resin derived from a phenol-dicyclopentadiene resin represented by general formula (6);

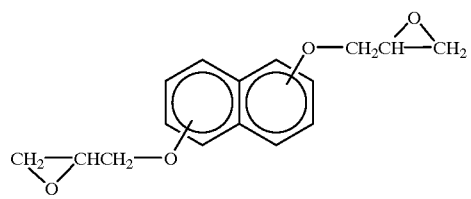

(2)

where the ring is substituted with 2,3-epoxypropyl groups at 1,5-, 1,6-, 1,7-, 2,6- or 2,7-positions

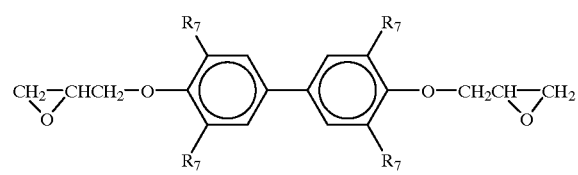

(3)

where $R_7$ all of which may be the same or not is hydrogen or methyl;

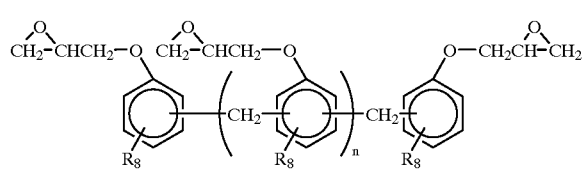

(4)

where $R_8$ is hydrogen, methyl or ethyl, and n is an integer of 0 to 100 whose average is 0 to 15;

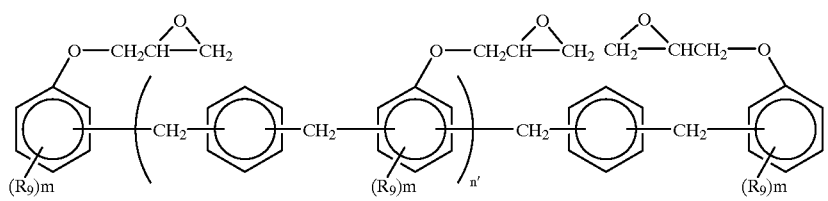

(5)

where $R_9$ is hydrogen, straight, branched or cyclic alkyl having 1 to 10 carbons, alkoxy having 1 to 10 carbons, hydroxyl, phenyl or halogen; m is an integer of 1 to 3; and n' is an integer of 0 to 100 whose average is 0 to 50;

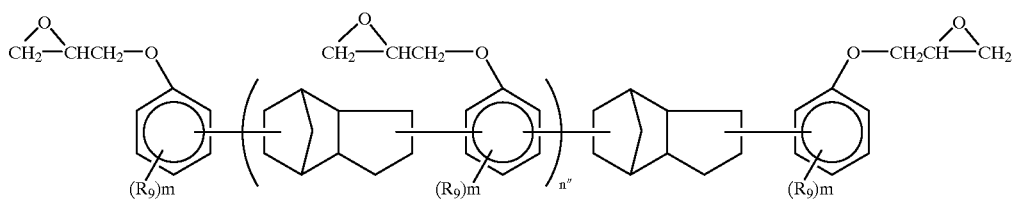
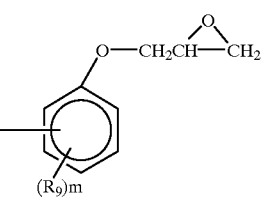

(6)

where $R_9$ is hydrogen, straight, branched or cyclic alkyl having 1 to 10 carbons, alkoxy having 1 to 10 carbons, hydroxyl, phenyl or halogen; m is an integer of 1 to 3; and n" is an integer of 0 to 50 whose average is 0 to 15.

3. An epoxy-resin composition as claimed in claim 1 where (B) the at least bifunctional ester-containing compound and/or the at least bifunctional ester-containing resin, 10 to 100% of whose hydroxy groups are esterified with aliphatic or aromatic acyl groups, is selected from ester-containing resins derived from a novolac type of resin represented by general formula (7);

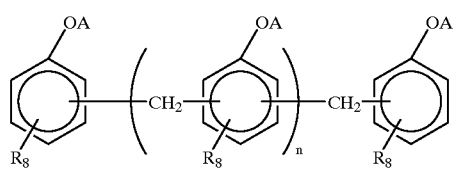

(7)

where $R_8$ is hydrogen, methyl or ethyl; A is hydrogen or acyl where the molar ratio of hydrogen/acyl is 90/10 to 0/100; and n indicates a repeating unit number which is an integer of 0 to 100 whose average is 0 to 15, provided when an average of n as a repeating unit number is zero, the formula represents bisphenol derivatives;

a phenol aralkyl resin represented by general formula (8);

n' indicates a repeating unit number which is an integer of 0 to 100 whose average is 0 to 50, provided when an average of n' as a repeating unit number is zero, the formula represents bisphenol derivatives; and A is hydrogen or acyl where the molar ratio of hydrogen/acyl is 90/10 to 0/100;

a phenol-dicyclopentadiene resin represented by general formula (9);

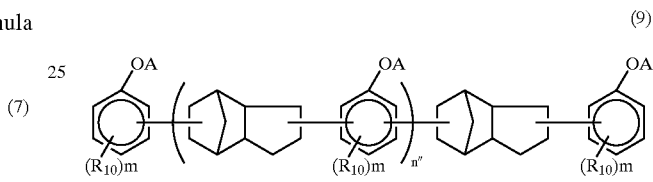

(9)

where $R_{10}$ is hydrogen, straight, branched or cyclic alkyl having 1 to 10 carbons, phenyl, hydroxy, halogen or alkoxy having 1 to 9 carbons; m is an integer of 1 to 3; n" indicates a repeating unit number which is an integer of 0 to 50 whose average is 0 to 15, provided when an average of n" as a repeating unit number is zero, the formula represents bisphenol derivatives; and A is hydrogen or acyl where the molar ratio of hydrogen/acyl is 90/10 to 0/100; and a naphthol aralkyl resin represented by general formula (10);

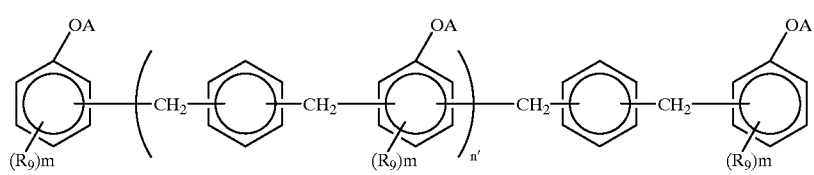

(8)

where $R_9$ is hydrogen, straight, branched or cyclic alkyl having 1 to 9 carbons, alkoxy having 1 to 10 carbons, phenyl, hydroxy or halogen; m is an integer of I to 3;

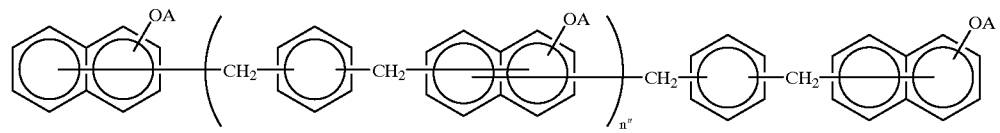

(10)

where n" indicates a repeating unit number which is an integer of 0 to 50 whose average is 0 to 15, provided when an average of n" as a repeating unit number is zero, the formula represents bisphenol derivatives; and A is hydrogen or acyl where the molar ratio of hydrogen/acyl is 90/10 to 0/100.

4. An epoxy-resin composition as claimed in claim 2 where (B) the at least bifunctional ester-containing compound and/or the at least bifunctional ester-containing resin, 10 to 100% of whose hydroxy groups are esterified with aliphatic or aromatic acyl groups, is selected from ester-containing resins derived from a novolac type of resin represented by general formula (7);

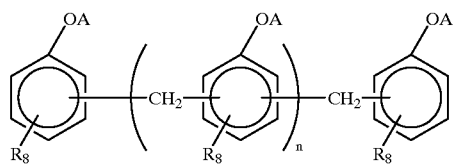

(7)

where $R_8$ is hydrogen, methyl or ethyl; A is hydrogen or acyl where the molar ratio of hydrogen/acyl is 90/10 to 0/100; and n indicates a repeating unit number which is an integer of 0 to 100 whose average is 0 to 15, provided when an average of n as a repeating unit number is zero, the formula represents a bisphenol compound;

a phenol aralkyl resin represented by general formula (8);

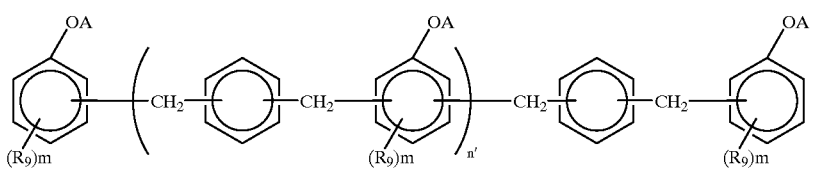

(8)

where $R_9$ is hydrogen, straight, branched or cyclic alkyl having 1 to 9 carbons, alkoxy having 1 to 10 carbons, phenyl, hydroxy or halogen; m is an integer of 1 to 3; n' indicates a repeating unit number which is an integer of 0 to 100 whose average is 0 to 50, provided when an average of n' as a repeating unit number is zero, the formula represents a bisphenol compound; and A is hydrogen or acyl where the molar ratio of hydrogen/acyl is 90/10 to 0/100;

a phenol-dicyclopentadiene resin represented by general formula (9);

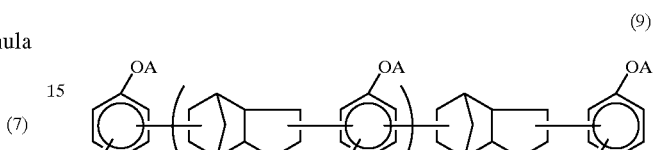

(9)

where $R_{10}$ is hydrogen, straight, branched or cyclic alkyl having 1 to 10 carbons, phenyl, hydroxy, halogen or alkoxy having 1 to 9 carbons; m is an integer of 1 to 3; n" indicates a repeating unit number which is an integer of 0 to 50 whose average is 0 to 15, provided when an average of n" as a repeating unit number is zero, the formula represents a bisphenol compound; and A is hydrogen or acyl where the molar ratio of hydrogen/acyl is 90/10 to 0/100; and a naphthol aralkyl resin represented by general formula (10);

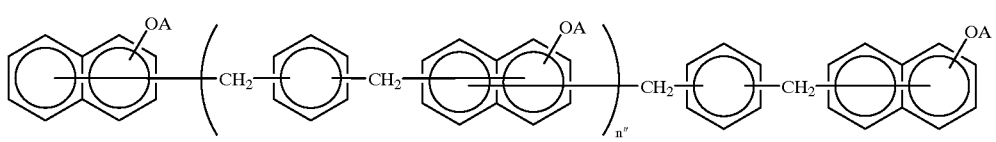

(10)

where n" indicates a repeating unit number which is an integer of 0 to 50 whose average is 0 to 15, provided when an average of n" as a repeating unit number is zero, the formula represents a bisphenol compound; and A is hydrogen or acyl where the molar ratio of hydrogen/acyl is 90/10 to 0/100.

5. An epoxy-resin composition as claimed in claim 4 comprising (D) an organic and/or inorganic filler in the range of 100 to 1900 parts by weight per 100 parts by weight of (A)+(B).

6. A cured product prepared by heat curing of the epoxy-resin composition as claimed in claim 5.

7. A semiconductor device manufactured by sealing a semiconductor integrated circuit using the epoxy-resin composition as claimed in claim 5.

8. An epoxy-resin composition as claimed in claim 3 comprising (D) an organic and/or inorganic filler in the range of 100 to 1900 parts by weight per 100 parts by weight of (A)+(B).

9. A cured product prepared by heat curing of the epoxy-resin composition as claimed in claim 8.

10. A semiconductor device manufactured by sealing a semiconductor integrated circuit using the epoxy-resin composition as claimed in claim 8.

11. An epoxy-resin composition as claimed in claim 2 comprising (D) an organic and/or inorganic filler in the range of 100 to 1900 parts by weight per 100 parts by weight of (A)+(B).

12. A cured product prepared by heat curing of the epoxy-resin composition as claimed in claim 11.

13. A semiconductor device manufactured by sealing a semiconductor integrated circuit using the epoxy-resin composition as claimed in claim 11.

14. An epoxy-resin composition as claimed in claim 1 comprising (D) an organic and/or inorganic filler in the range of 100 to 1900 parts by weight per 100 parts by weight of (A)+(B).

15. A cured product prepared by heat curing of the epoxy-resin composition as claimed in claim 14.

16. A semiconductor device manufactured by sealing a semiconductor integrated circuit using the epoxy-resin composition as claimed in claim 14.

* * * * *